(12) United States Patent
Wang et al.

(10) Patent No.: US 12,548,470 B2
(45) Date of Patent: Feb. 10, 2026

(54) PAD ASSEMBLY FOR ANTHROPOMORPHIC TEST DEVICE

(71) Applicant: Humanetics Innovative Solutions, Inc., Farmington Hills, MI (US)

(72) Inventors: Zhenwen J. Wang, Farmington Hills, MI (US); Yuanhui Fu, South Lyon, MI (US); Joseph P. McInnis, New Hudson, MI (US); John A. Arthur, Milan, OH (US)

(73) Assignee: Humanetics Innovative Solutions, Inc., Farmington Hills, MI (US)

( * ) Notice: Subject to any disclaimer, the term of this patent is extended or adjusted under 35 U.S.C. 154(b) by 396 days.

(21) Appl. No.: 18/359,328

(22) Filed: Jul. 26, 2023

(65) Prior Publication Data

US 2023/0368702 A1     Nov. 16, 2023

Related U.S. Application Data

(63) Continuation of application No. 16/669,637, filed on Oct. 31, 2019, now Pat. No. 11,756,450.

(60) Provisional application No. 62/754,137, filed on Nov. 1, 2018.

(51) Int. Cl.
    *G09B 23/30*         (2006.01)
    *G01M 17/007*      (2006.01)

(52) U.S. Cl.
    CPC .......... *G09B 23/30* (2013.01); *G01M 17/0078* (2013.01)

(58) Field of Classification Search
    CPC .... G09B 23/30; G09B 23/32; G01M 17/0078
    USPC ....... 73/865.1, 865.4, 865.6, 866.4; 434/262, 434/268, 274
    See application file for complete search history.

(56) References Cited

U.S. PATENT DOCUMENTS

| | | |
|---|---|---|
| 11,756,450 B2 | 9/2023 | Wang et al. |
| 2005/0258199 A1 | 11/2005 | Honer et al. |
| 2013/0000426 A1 | 1/2013 | Arthur et al. |

(Continued)

FOREIGN PATENT DOCUMENTS

| | | |
|---|---|---|
| JP | S48010701 A | 2/1973 |
| JP | 2005077356 A | 3/2005 |

(Continued)

OTHER PUBLICATIONS

English language abstract for JP 2005-077356 A extracted from espacenet.com database on Oct. 8, 2020, 1 page.

(Continued)

*Primary Examiner* — Robert R Raevis
(74) *Attorney, Agent, or Firm* — Howard & Howard Attorneys PLLC

(57) ABSTRACT

An anthropomorphic test device includes a spine assembly, a pair of clavicle assemblies coupled to the spine assembly, a pair of arms with a respective one arm coupled to a respective one clavicle assembly, and at least one pad assembly having a clavicle portion mounted to a respective one of the clavicle assemblies and positioned onto a respective one arm. Each pad assembly includes a clavicle portion, which includes an arm portion and a clavicle base region, and a neck portion, which includes a raised neck region and a neck base region. The neck portion and clavicle portion are each formed from materials with the neck portion being stiffer than the clavicle portion. The pad assembly is configured to provide a human-like response while reducing or eliminating entrapment of a shoulder belt during a crash test.

11 Claims, 20 Drawing Sheets

(56) References Cited

U.S. PATENT DOCUMENTS

| | | |
|---|---|---|
| 2014/0190279 A1 | 7/2014 | Been et al. |
| 2016/0078783 A1 | 3/2016 | Sullenberger et al. |
| 2016/0189569 A1 | 6/2016 | Been |
| 2020/0143709 A1 | 5/2020 | Wang et al. |

FOREIGN PATENT DOCUMENTS

| | | |
|---|---|---|
| JP | 2005078568 A | 3/2005 |
| JP | 2005353078 A | 12/2005 |
| JP | 2015099137 A | 5/2015 |

OTHER PUBLICATIONS

English language abstract for JP 2005-078568 A extracted from espacenet.com database on Oct. 8, 2020, 1 page.
English language abstract for JP 2005-353078 A extracted from espacenet.com database on Oct. 8, 2020, 1 page.
English language abstract for JP 2015-099137 A extracted from espacenet.com database on Oct. 8, 2020, 1 page.
English language translation for JPS 48-010701 A provided by Agile Legal on Sep. 20, 2022, 4 pages.
scribd.com, "ASTM D575-91—Standard Test Methods for Rubber Properties in Compression", Reapproved 2001, 4 pages.
Tylko, S. et al., "Effects of Shoulder-Belt Slip on the Kinetics and Kinematics of THOR", Proceedings of International Research Council on the Biomechanics of Injury (IRCOBI), Athens, Greece, Sep. 12-14, 2018, pp. 593-607.
United Kingdom Search Report for Application GB 1915850.0 dated Apr. 27, 2020, 1 page.

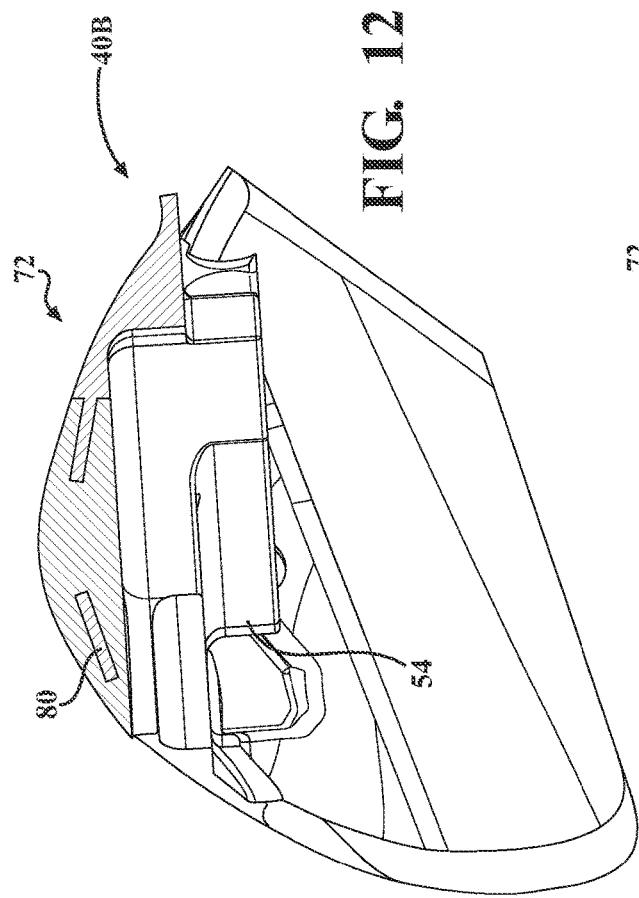
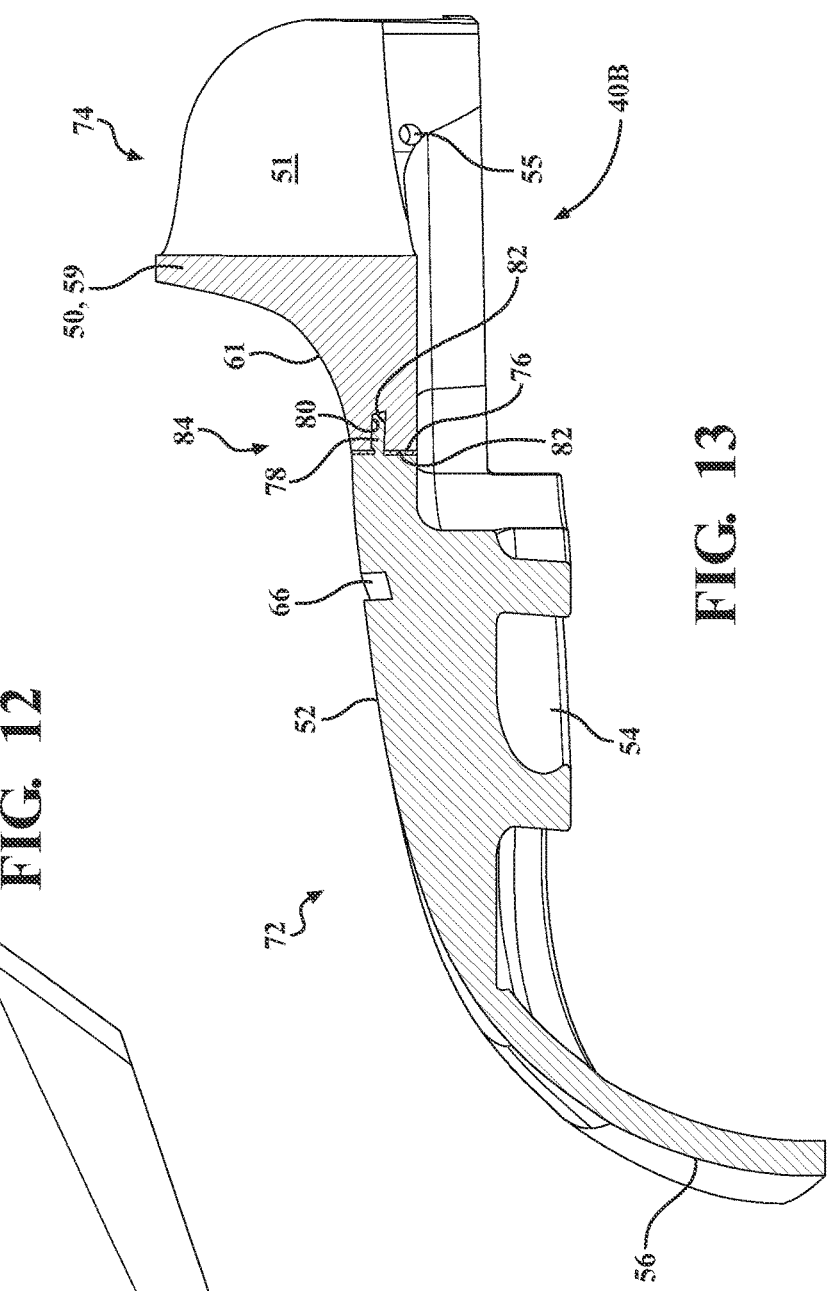
FIG. 12
FIG. 13

PAD ASSEMBLY FOR ANTHROPOMORPHIC TEST DEVICE

CROSS-REFERENCE TO RELATED APPLICATIONS

The subject application is a continuation of U.S. patent application Ser. No. 16/669,637, filed on Oct. 31, 2019, which claims priority to and all the benefits of U.S. Provisional Patent Application No. 62/754,137, filed on Nov. 1, 2018, the disclosures of which are hereby incorporated by reference.

BACKGROUND OF THE INVENTION

1. Field of the Invention

The present invention relates generally to anthropomorphic test devices and, more particularly, to a pad assembly for an anthropomorphic test device.

2. Description of the Related Art

In the past few decades, anthropomorphic test devices (ATDs) (also referred to as "crash test dummies") have been utilized for crash testing as it relates to vehicle development such that vehicles can comply with Federal Motor Vehicle Safety Standard (FMVSS) in terms of crash safety.

These anthropomorphic test devices include a variety of biomechanical components that are assembled in a way such that they can simulate a human-like response to crash conditions that can be measured and evaluated with the goal of improving safety for drivers and passengers riding in a vehicle.

One biomechanical component that is generally included in anthropomorphic test devices is a pad assembly, typically a left and a right pad assembly, which are respectively positioned on the ATD adjacent to the spine assembly/neck assembly and is generally seated onto the clavicle assembly and arm assembly. The left and right pad assembly typically include a neck region adjacent to the spine assembly/neck assembly, a clavicle base assembly extending from the neck region and seated onto the clavicle assembly, and an arm portion, sometimes referred to as a lateral portion, extending from the clavicle base assembly and seated onto the arm assembly. Conventional pad assemblies (see FIGS. 2-5, which may be coupled into an anthropomorphic test device as in FIG. 1) are typically formed as a single piece, and as a single low stiffness material, with the geometrical design of the pad assembly designed to be shaped and weighted to simulate the response of a human shoulder during crash test simulations. During these crash test simulations, the anthropomorphic test device is positioned on a vehicle seat, and a seat belt having a shoulder belt portion is used to restrain the anthropomorphic test device in a manner in which a human would typically be restrained in a vehicle. The shoulder belt portion is positioned adjacent to the neck region of the pad assembly.

In a recent study by Tylko et al. 2018 (Tylko, S., Tang, K., Giguere, F., Bussieres, A., Effects of Shoulder-belt Slip on the Kinetics and Kinematics of the THOR, Proceedings of International Research Council on the Biomechanics of Injury (IRCOBI), Athens, Greece, 12-14 Sep. 2018), during crash testing of the anthropomorphic test device having pad assemblies formed as a single low stiffness piece, it has been found that the shoulder belt portion of a seat belt, while properly positioned prior to crash testing (see FIGS. 3 and 4), slips relative and is entrapped between the respective pad assembly and the neck assembly/spine assembly after crash testing (see FIG. 5). This entrapment of the shoulder belt portion causes an un-human like response output from the anthropomorphic test device having these pad assemblies during crash testing. Examples of such un-human like response include increased fore-aft and lateral shear load at the lower neck, reduced fore-aft loads at the inboard and outboard portions of the respective clavicle assembly, and reduced fore-aft chest deflections in the upper left and lower right quadrants or lower left and upper right quadrants (depending upon if the shoulder belt is positioned across the left or right pad assembly). The present disclosure provides a pad assembly to address this issue.

SUMMARY OF THE INVENTION

The present disclosure is directed to a pad assembly for an anthropomorphic test device, or crash test dummy.

The anthropomorphic test device comprises a spine assembly; a pair of clavicle assemblies coupled to and extending respectively from opposite sides of the spine assembly; a pair of arms with a respective one of the pair of arms coupled to a corresponding respective one of the pair of clavicle assemblies. The pad assembly has a clavicle portion positioned adjacent one of the pair of arms and a neck portion mounted to the clavicle portion and positioned adjacent to the spine assembly wherein the neck portion is stiffer than the clavicle portion.

The at least one pad assembly formed with the neck portion being stiffer than the clavicle portion is configured to provide a human-like response for the anthropomorphic test device while reducing or eliminating entrapment of a shoulder belt portion of a seat belt during a crash test as compared with a pad assembly formed from pad assembly in which the neck portion and clavicle portion are formed from the same material as a single, integrated low stiffness pad assembly.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 1I is a rear and bottom perspective view of the anthropomorphic test device of FIG. 1D.

FIG. 12 is a section view of FIG. 6 taken along line 12-12.

FIG. 13 is a section view of FIG. 6 taken along line 13-13.

DESCRIPTION OF THE PREFERRED EMBODIMENT(S)

Figure 14:
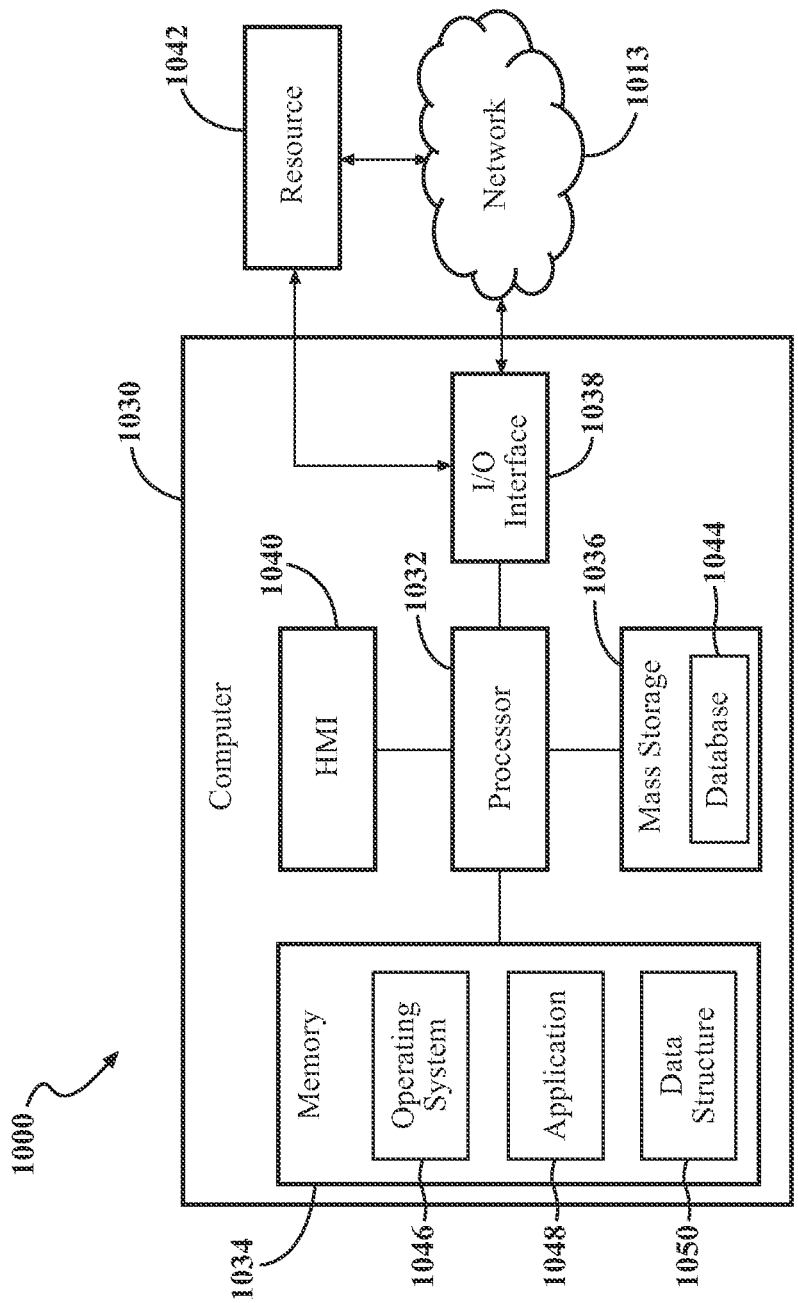
FIG. 14 is a schematic view of a system for creating and evaluating a virtual anthropomorphic test device.

Referring to the drawings, a portion of an anthropomorphic test device, or crash test dummy is generally indicated as 12, which includes at least one pad assembly, and typically includes a pair of pad assemblies (a pair of pad assemblies 40, 42, and in particular a pair of pad assemblies 40B, 42B, are illustrated in FIGS. 1A-1D). FIG. 14 is also provided below which describes a system 1000 for creating and evaluating a virtual form of the anthropomorphic test device 12 including at least one pad assembly formed in accordance with the exemplary embodiment.

The anthropomorphic test device 12 is of a fiftieth percentile (50%) male type. This anthropomorphic test device 12 is used primarily to test the performance of automotive interiors and restraint systems for adult front and rear seat occupants. The size and weight of the anthropomorphic test device 12 are based on anthropometric studies, which are typically done separately by the following organizations, University of Michigan Transportation Research Institute (UMTRI), U.S. Military Anthropometry Survey (ANSUR), and Civilian American and European Surface Anthropometry Resource (CESAR). It should be appreciated that ranges of motions, centers of gravity, and segment masses simulate those of human subjects defined by the anthropometric data.

Figure 1A:
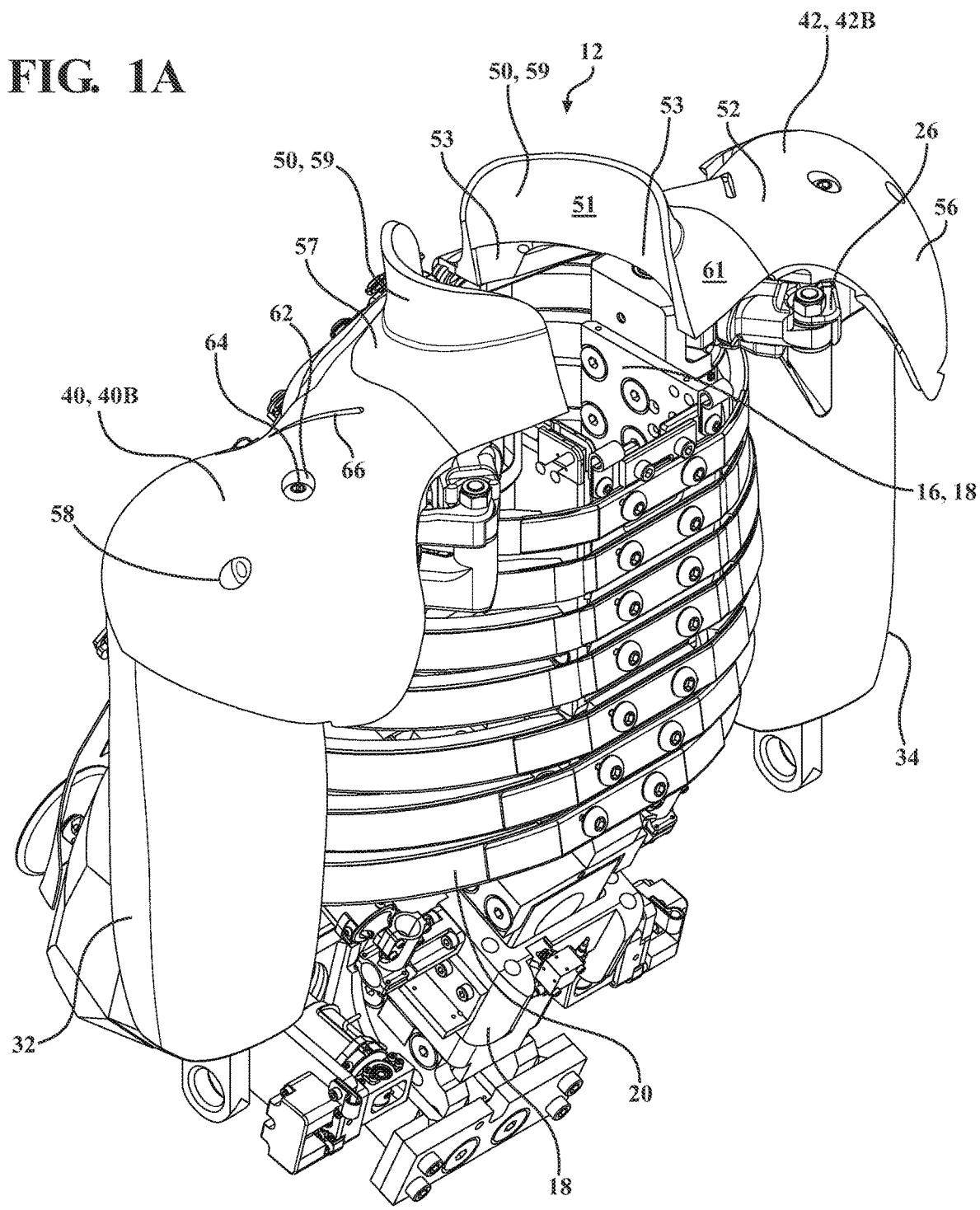
FIG. 1A is a perspective view illustrating a portion of an anthropomorphic test device, or crash test dummy, including at least one pad assembly in accordance with an embodiment of the present disclosure.
Figure 1B:
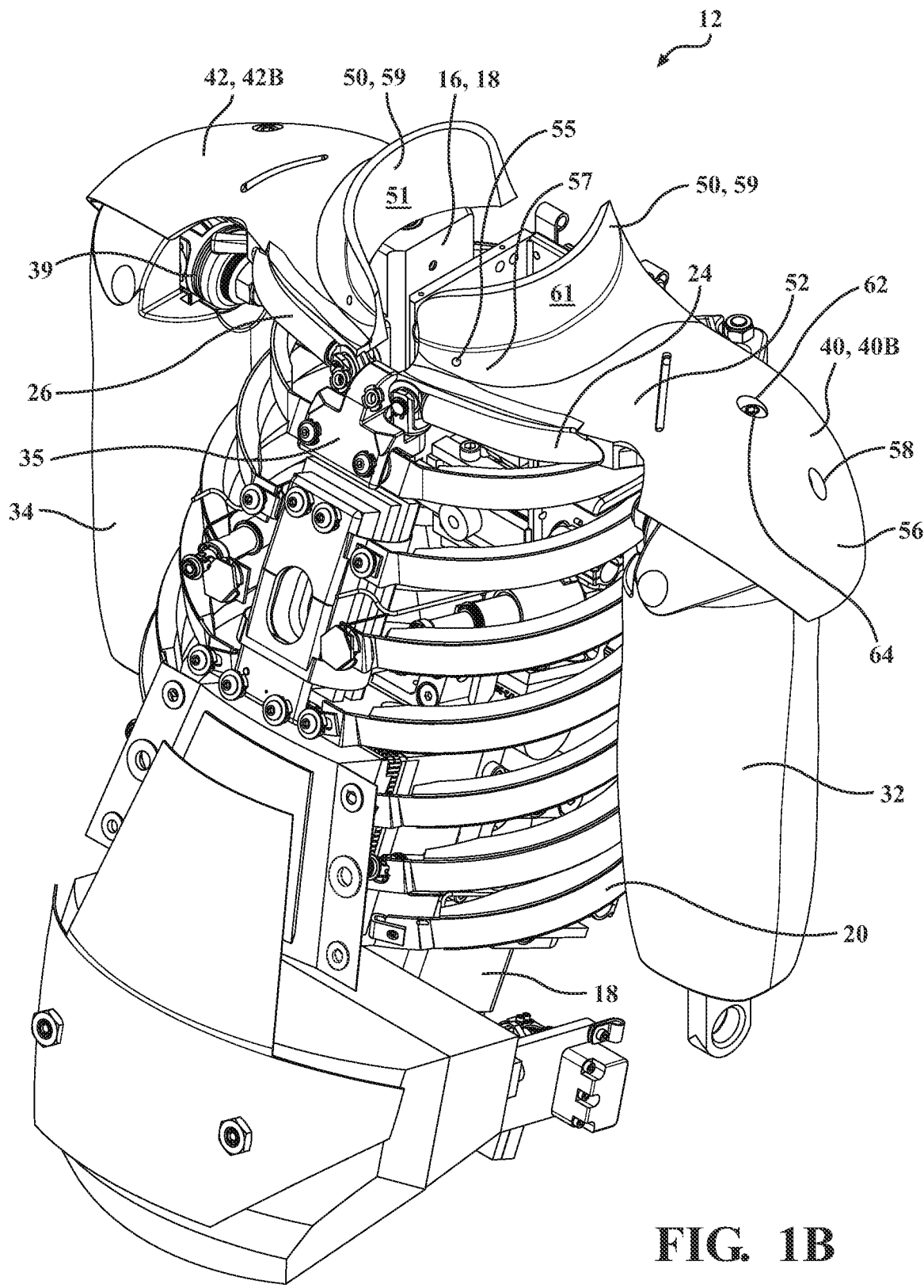
FIG. 1B is a front perspective view of the anthropomorphic test device of FIG. 1A.
Figure 1C:
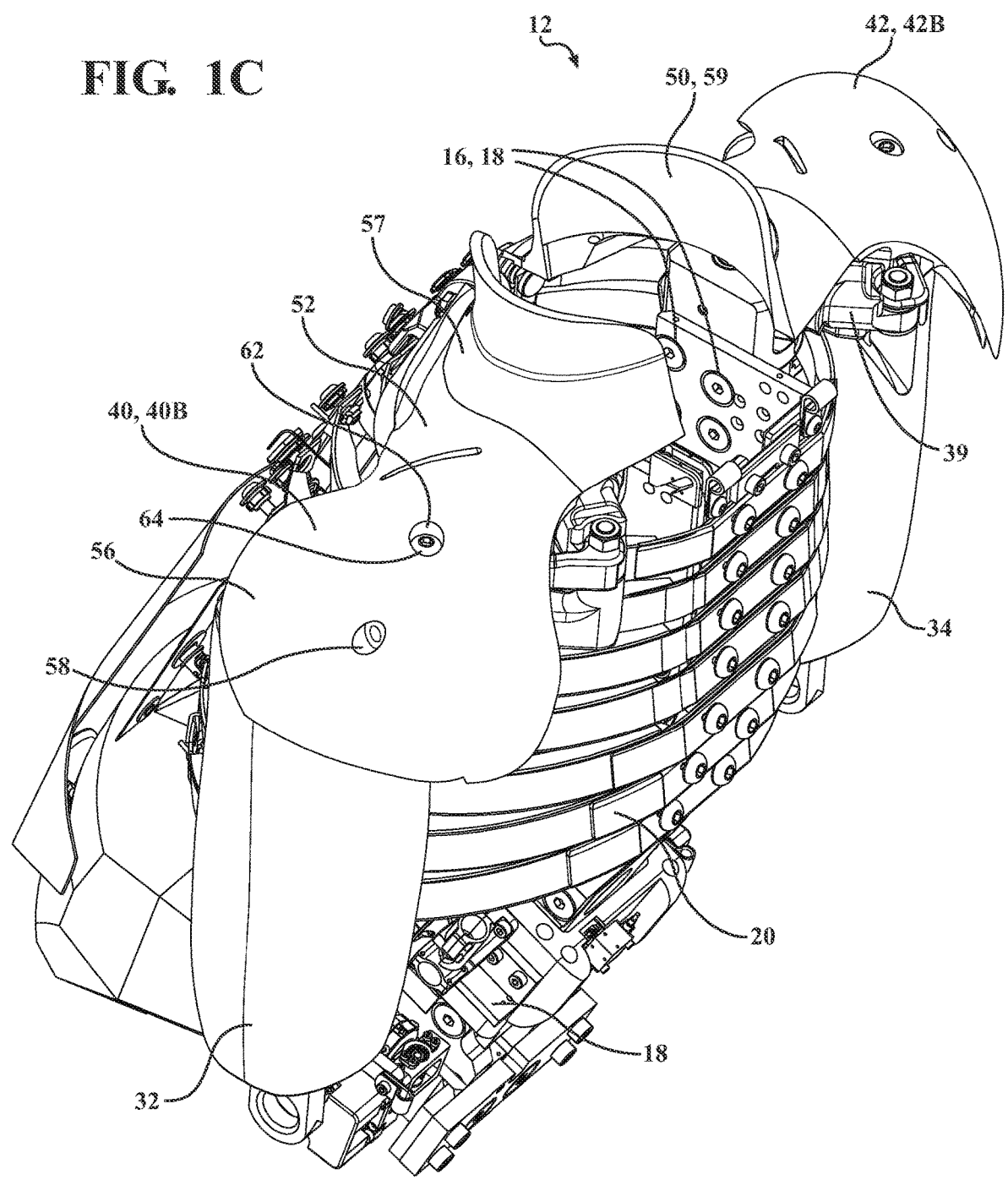
FIG. 1C is a partially rotated perspective view of the anthropomorphic test device of FIG. 1A.
Figure 1D:
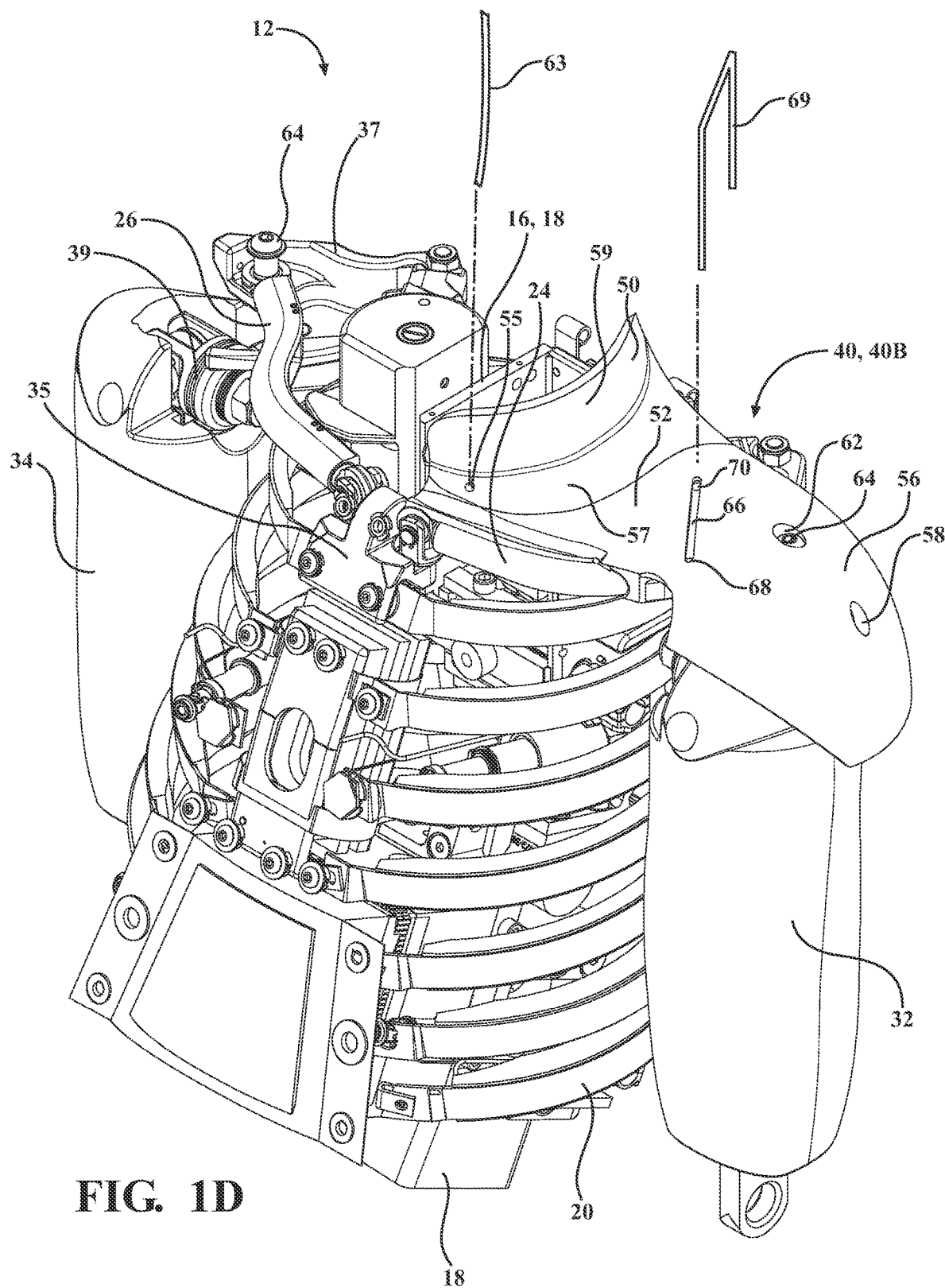
FIG. 1D is a front perspective view of the anthropomorphic test device of FIGS. 1A-1C with one of the pad assemblies removed.
Figure 1E:
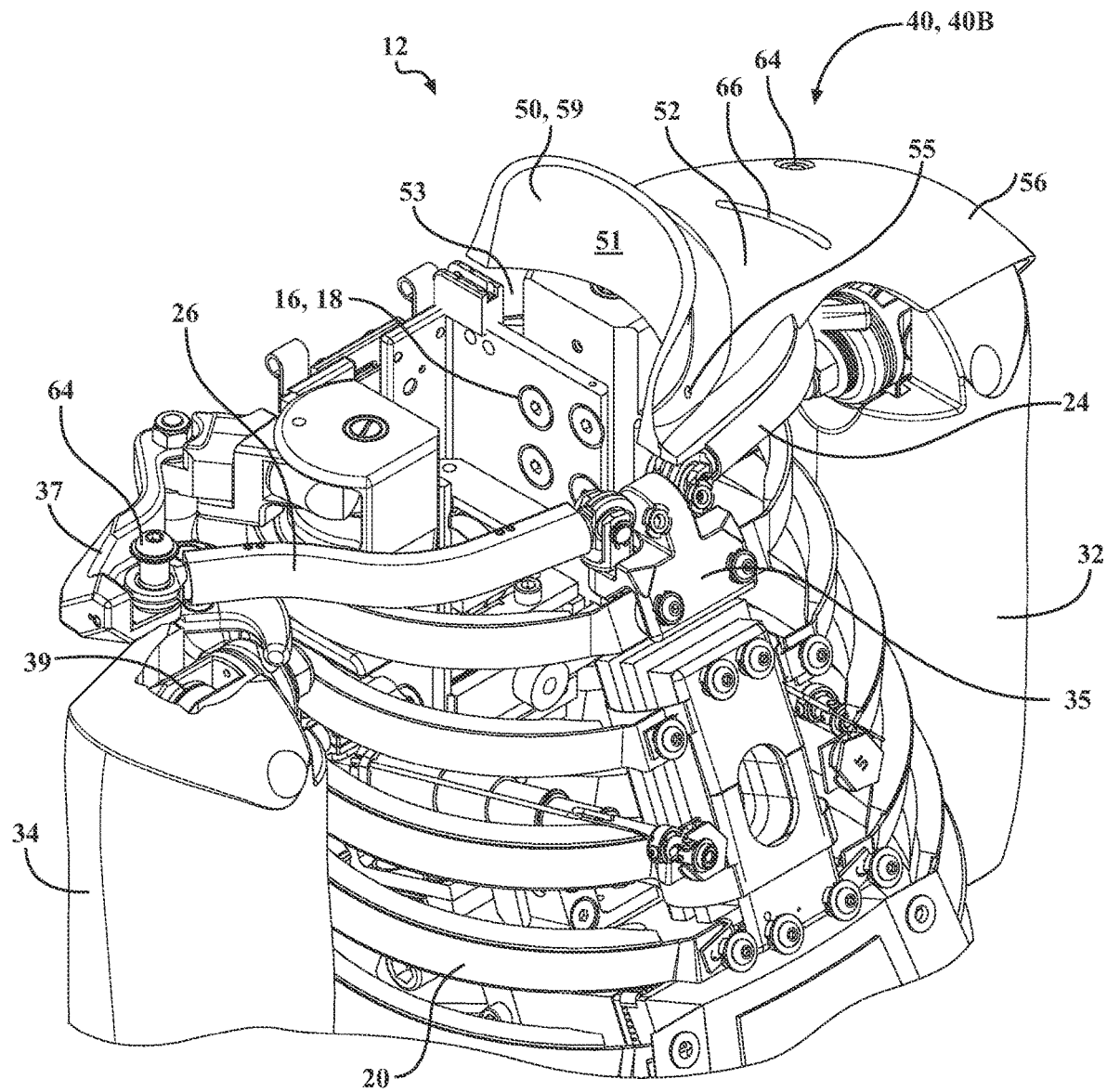
FIG. 1E is another front and top perspective view of the anthropomorphic test device of FIG. 1D.
Figure 1F:
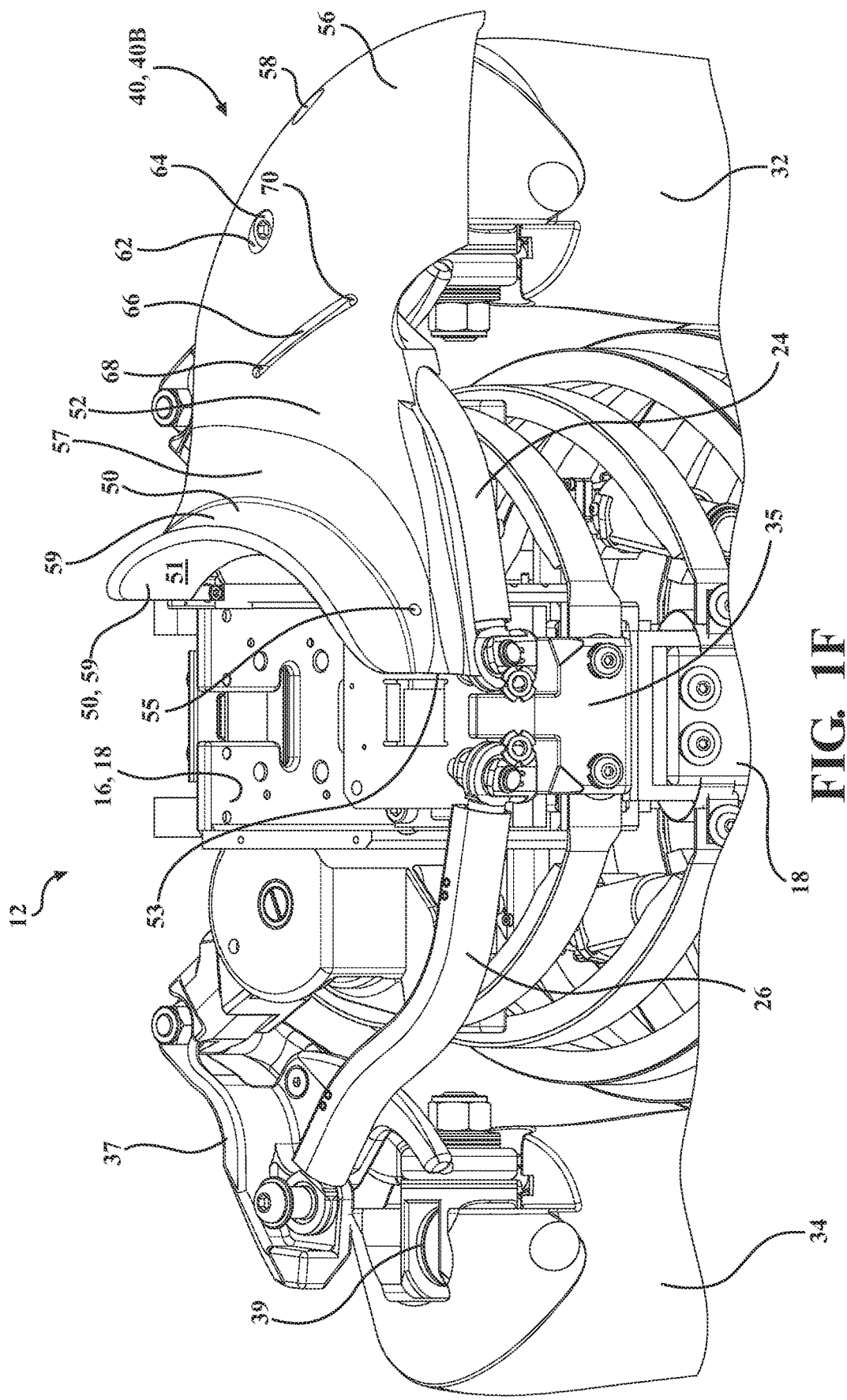
FIG. 1F is another front perspective view of the anthropomorphic test device of FIG. 1D.
Figure 1G:
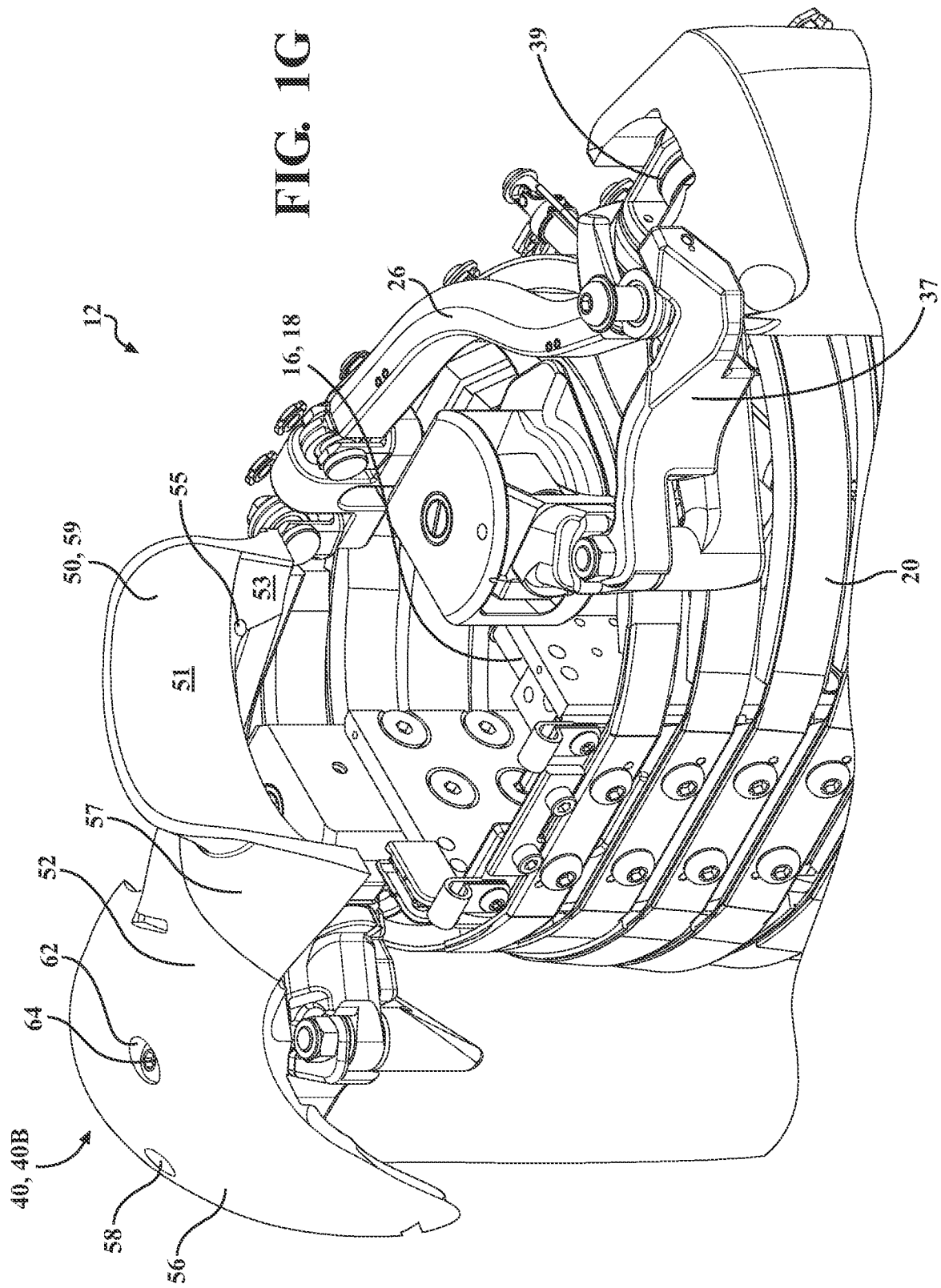
FIG. 1G is a rear and top perspective view of the anthropomorphic test device of FIG. 1D.
Figure 1H:
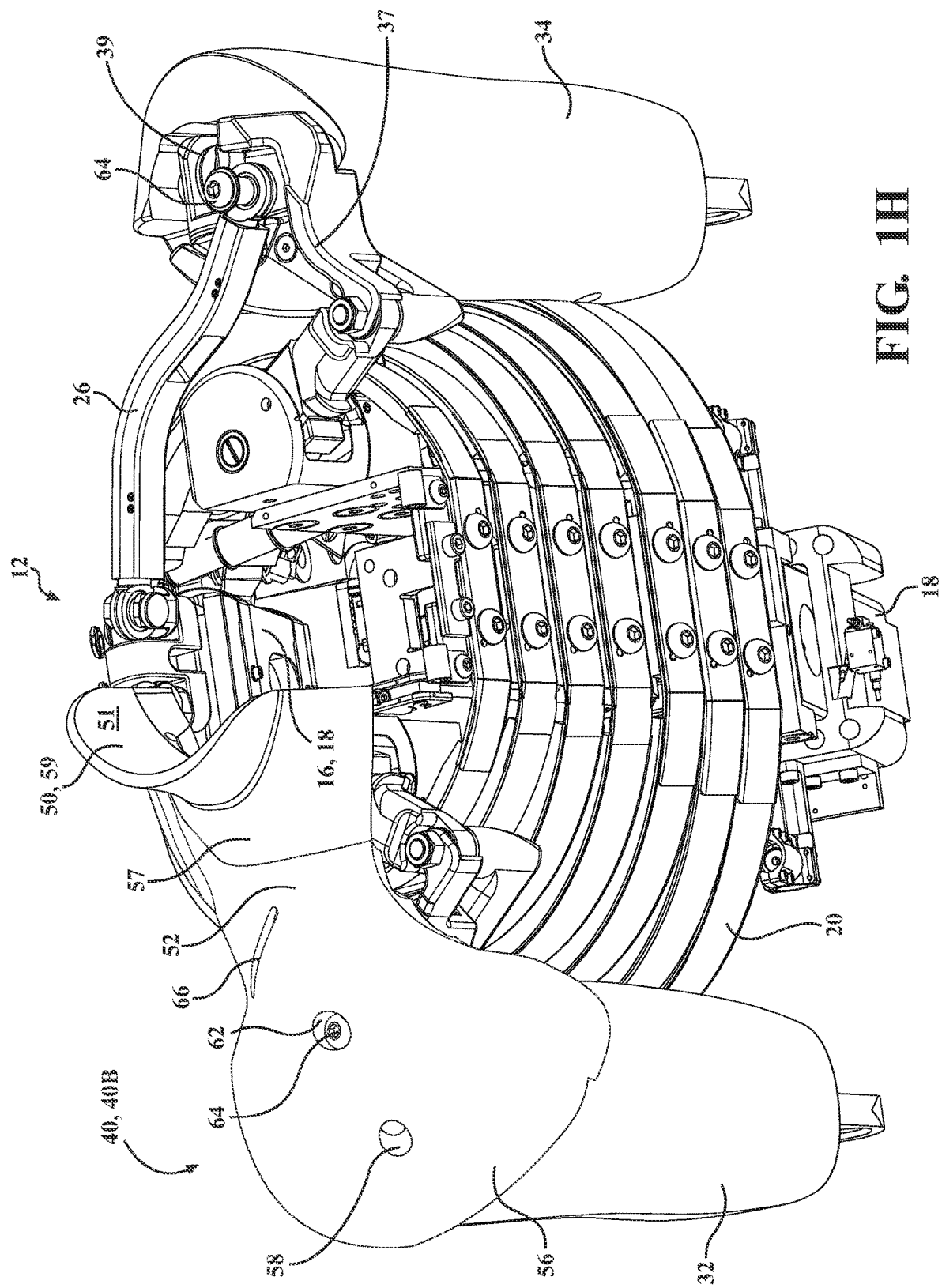
FIG. 1H is another rear perspective view of the anthropomorphic test device of FIG. 1D.
Figure 11:
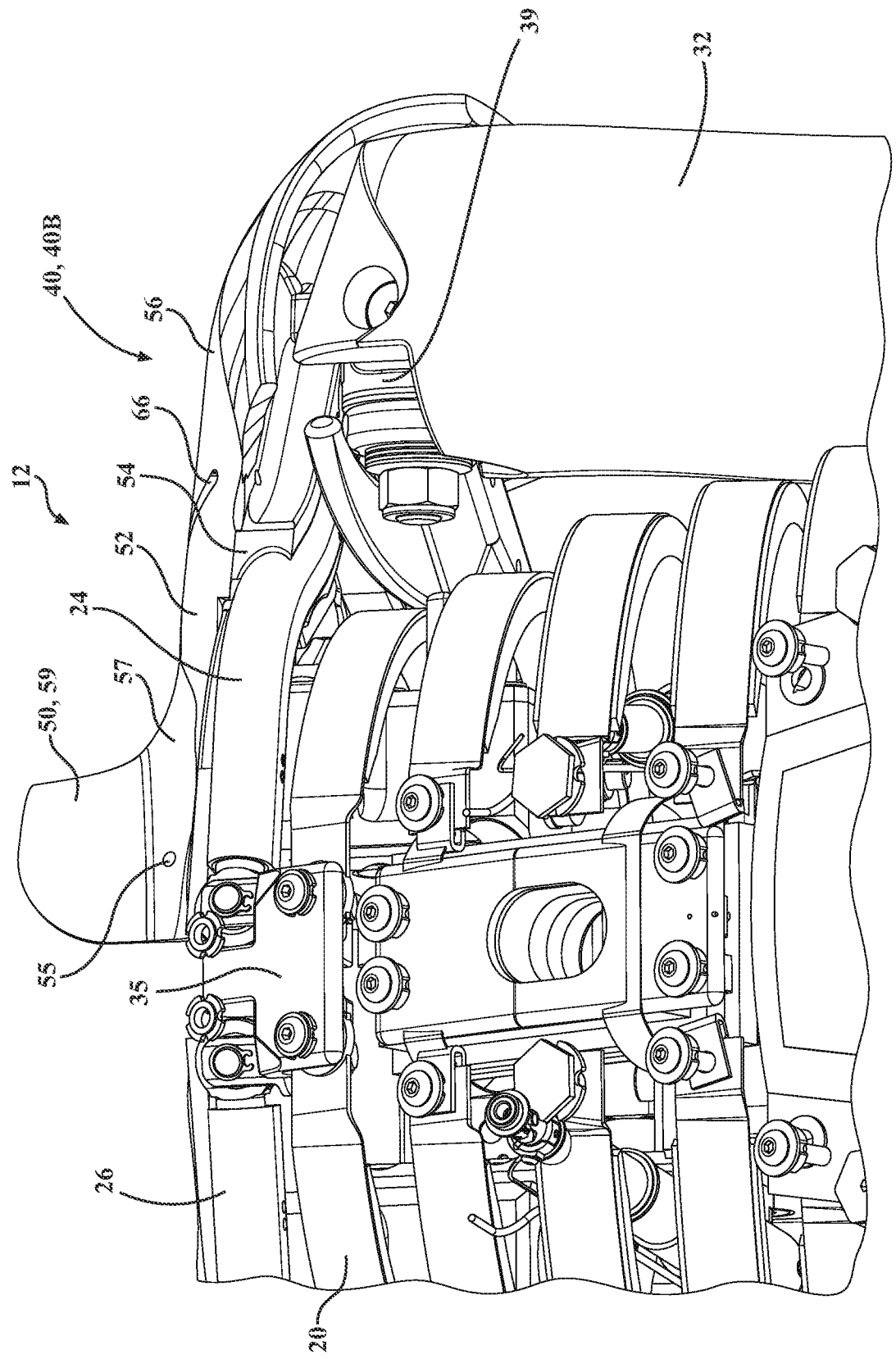
FIG. 11 is a rear view of FIG. 10.
Figure 2:
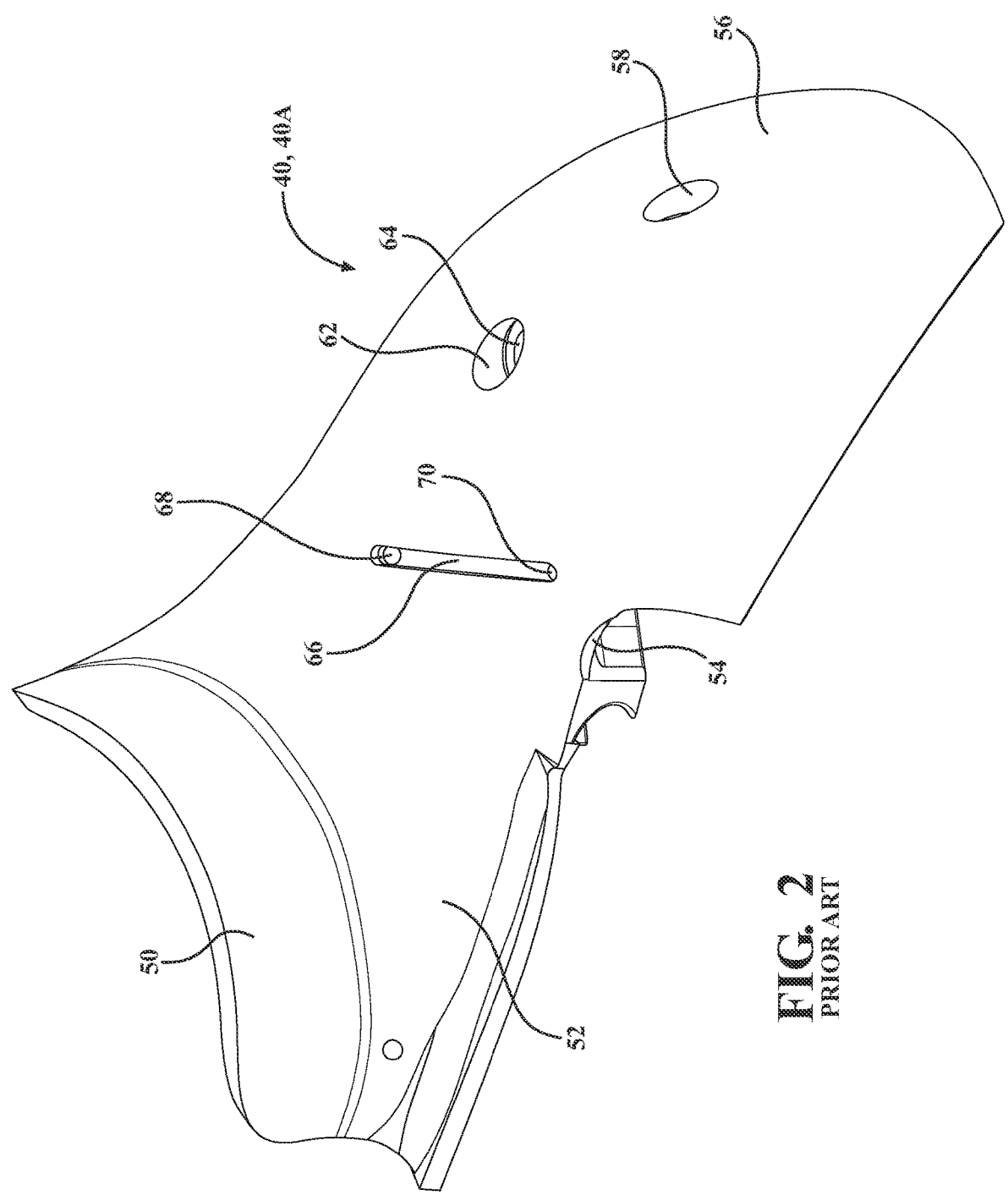
FIG. 2 is a front perspective view of a pad assembly in accordance with the prior art for use in replacing the at least one pad assembly on the anthropomorphic test device of FIGS. 1A-1I.
Figure 3:
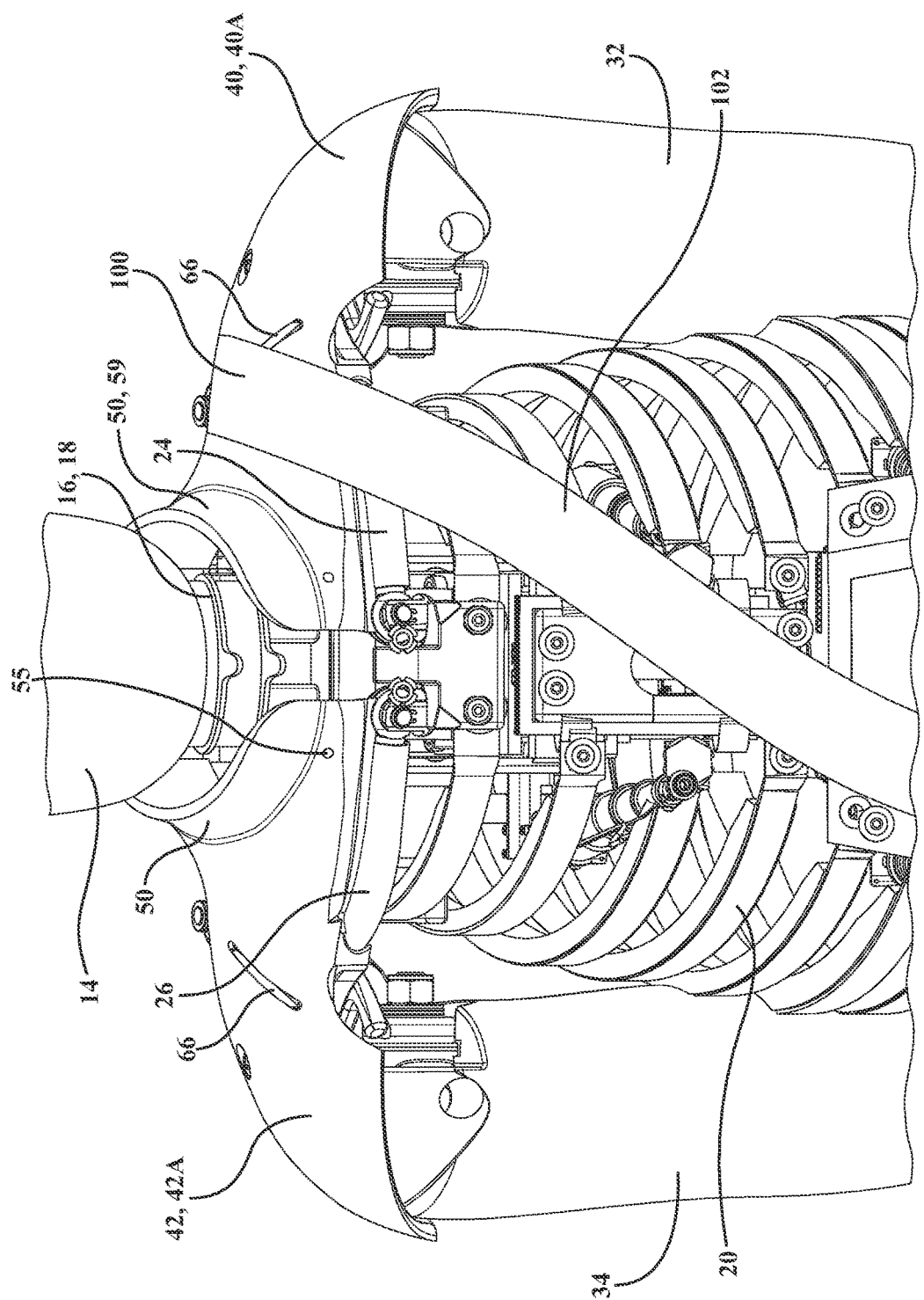
FIG. 3 is a front perspective view of the anthropomorphic test device of FIGS. 1A-1I having the pad assembly of FIG. 2 with a shoulder belt portion of a seat belt initially positioned adjacent to the pad assembly.
Figure 4:
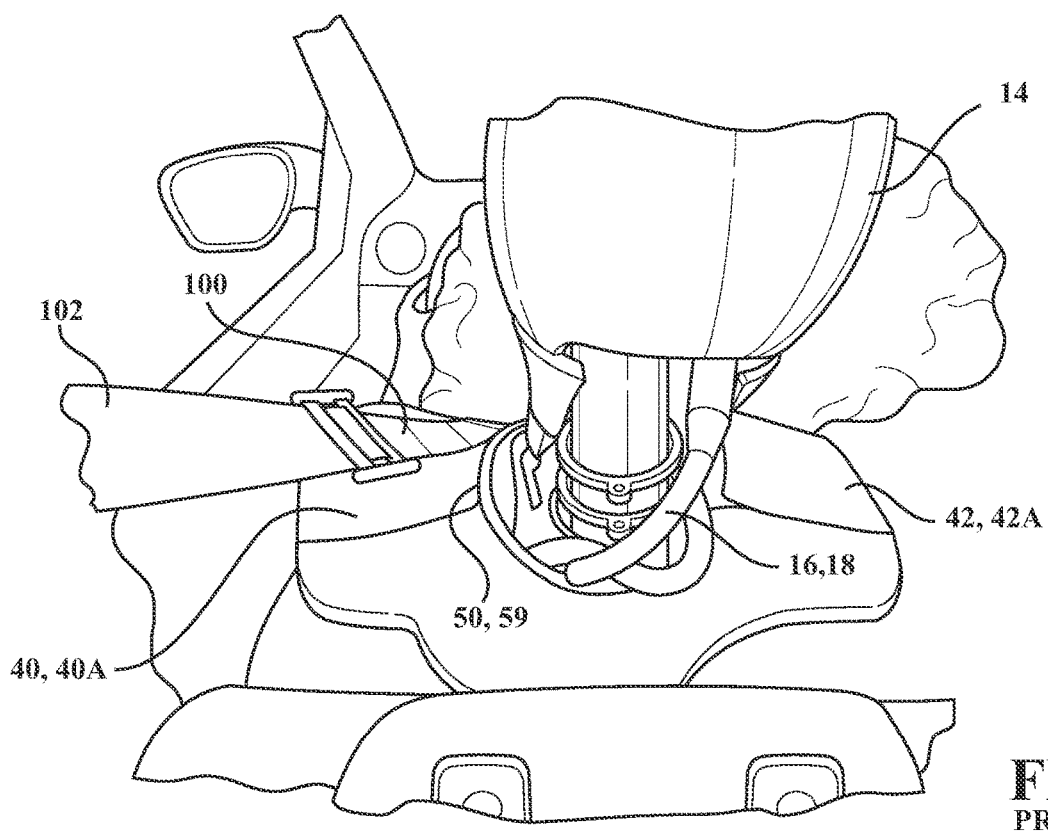
FIG. 4 is a rear perspective view of the anthropomorphic test device having a shoulder belt portion of the seat belt initially positioned adjacent to the pad assembly prior to a crash test.
Figure 5:
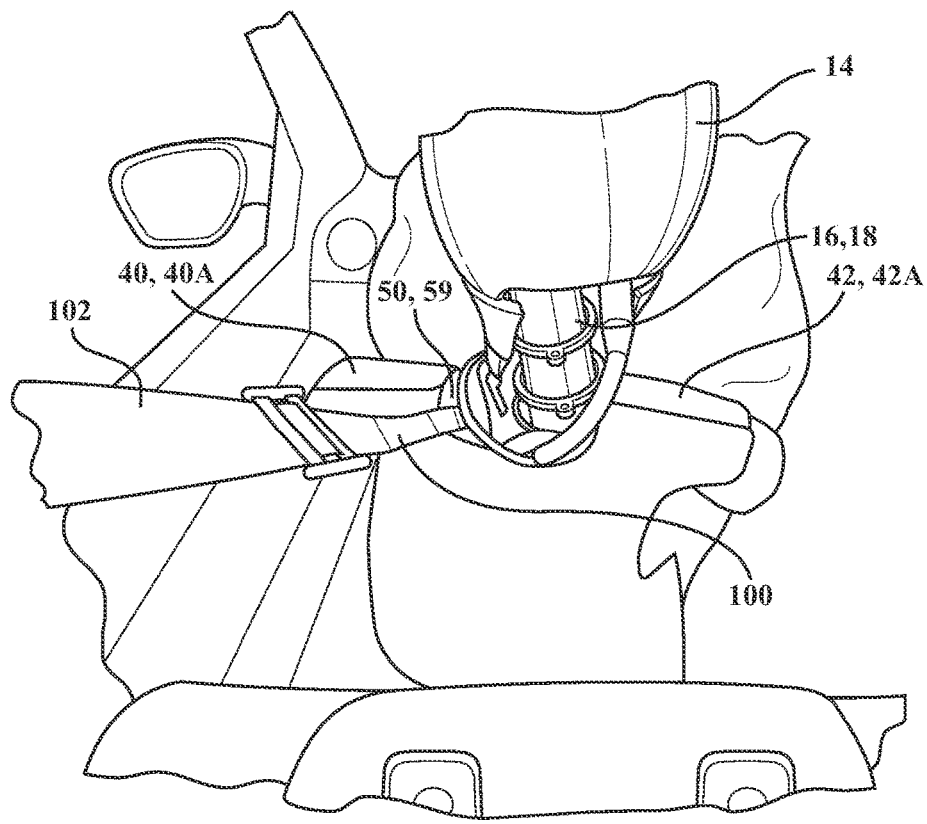
FIG. 5 is a rear perspective view of the anthropomorphic test device having a shoulder belt portion of the seat belt in an entrapped positioned after a crash test.
Figure 6:
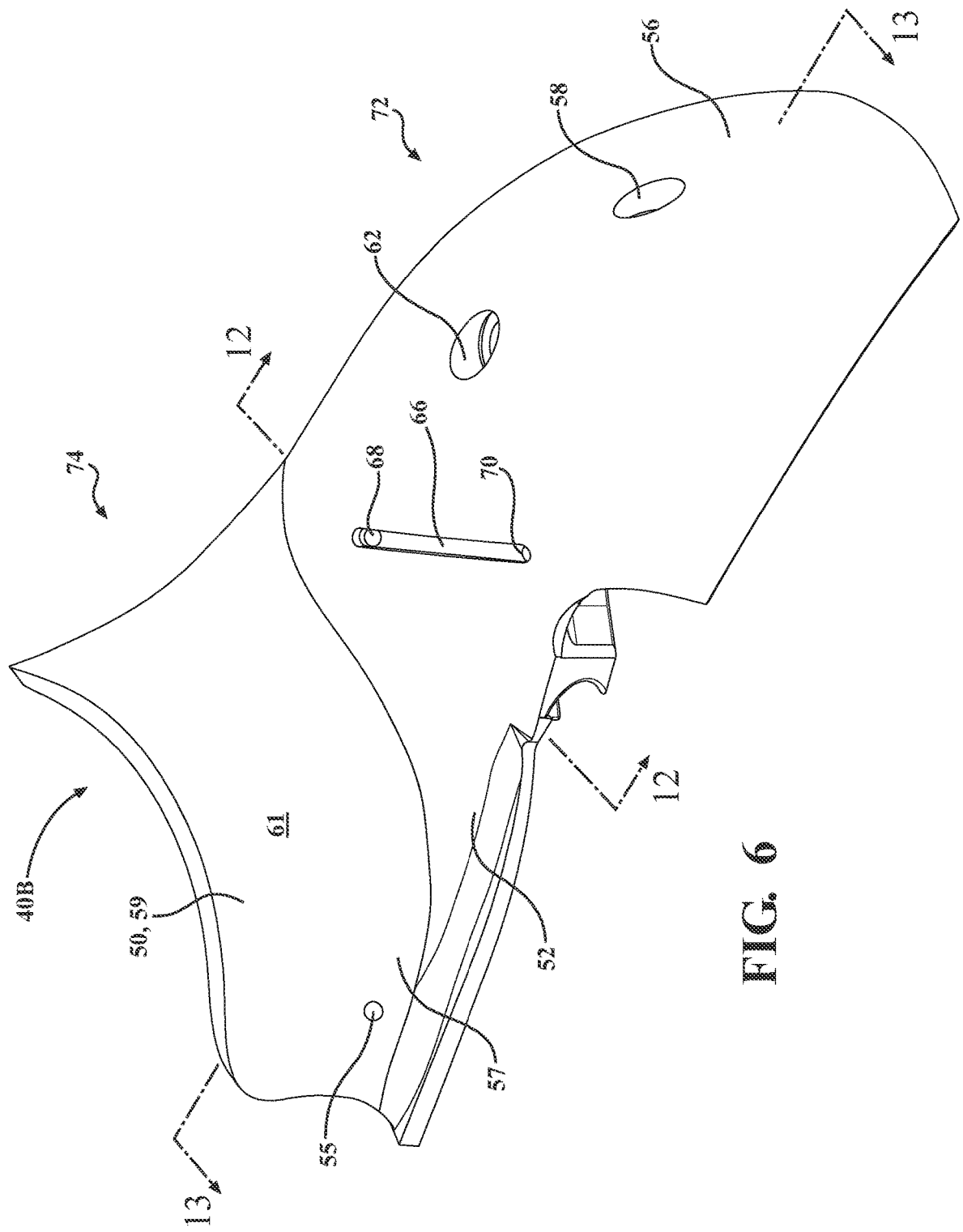
FIG. 6 is a front perspective view of a pad assembly of an anthropomorphic test device of FIGS. 1A-1I in accordance with one embodiment of the present invention.
Figure 7:
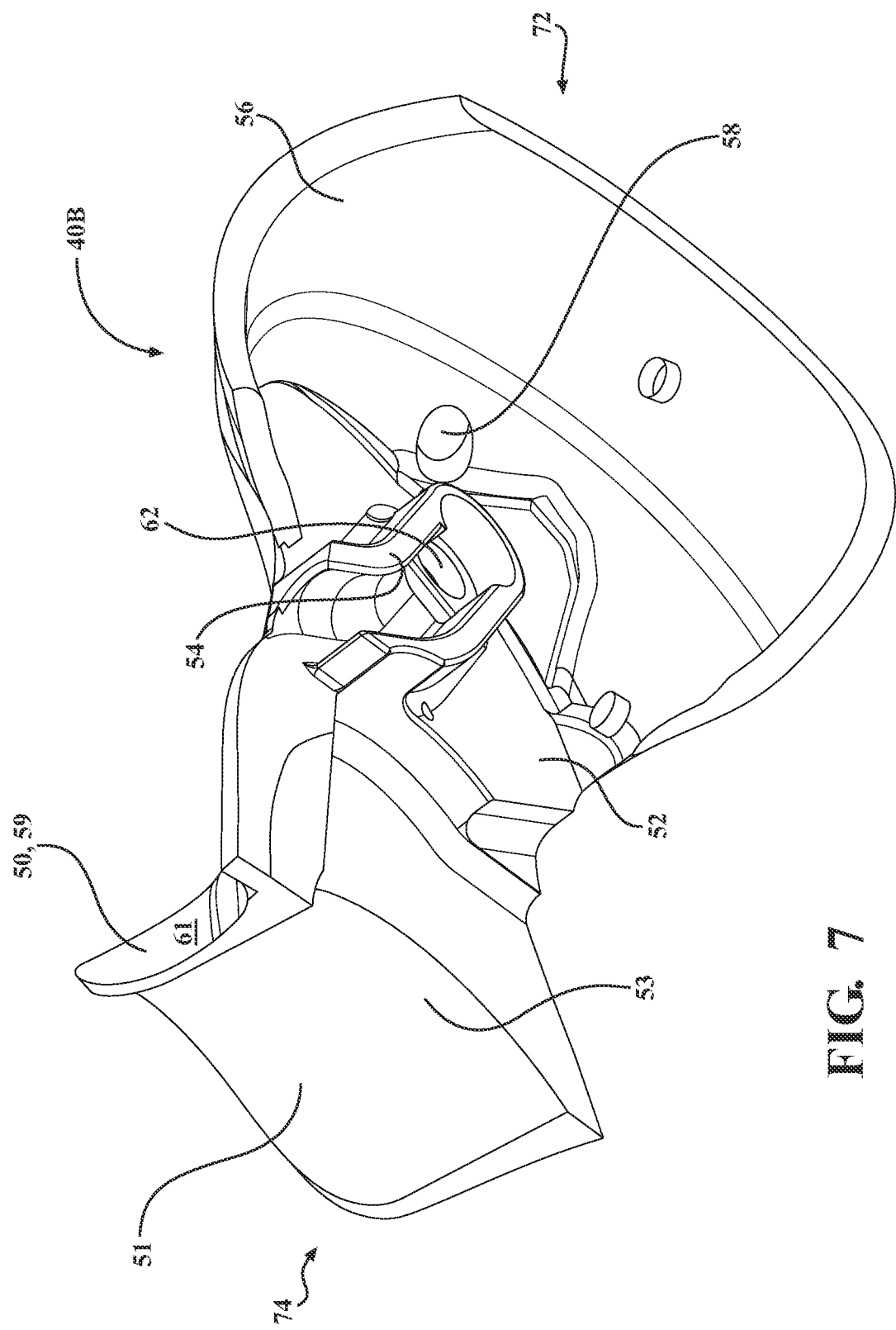
FIG. 7 is rear perspective view of the pad assembly of FIG. 6.
Figure 8:
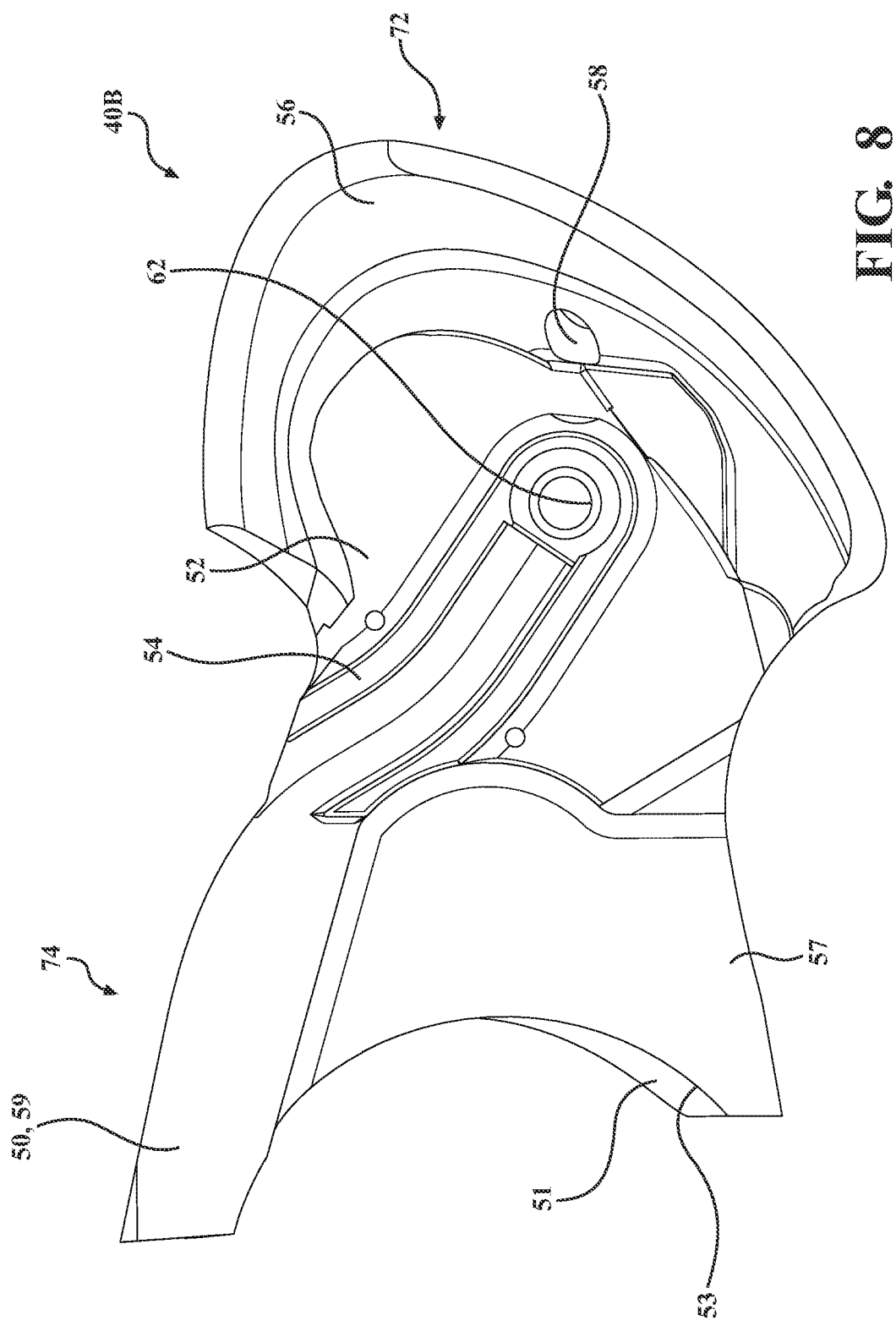
FIG. 8 is another rear perspective view of the pad assembly of FIG. 6.
Figure 9:
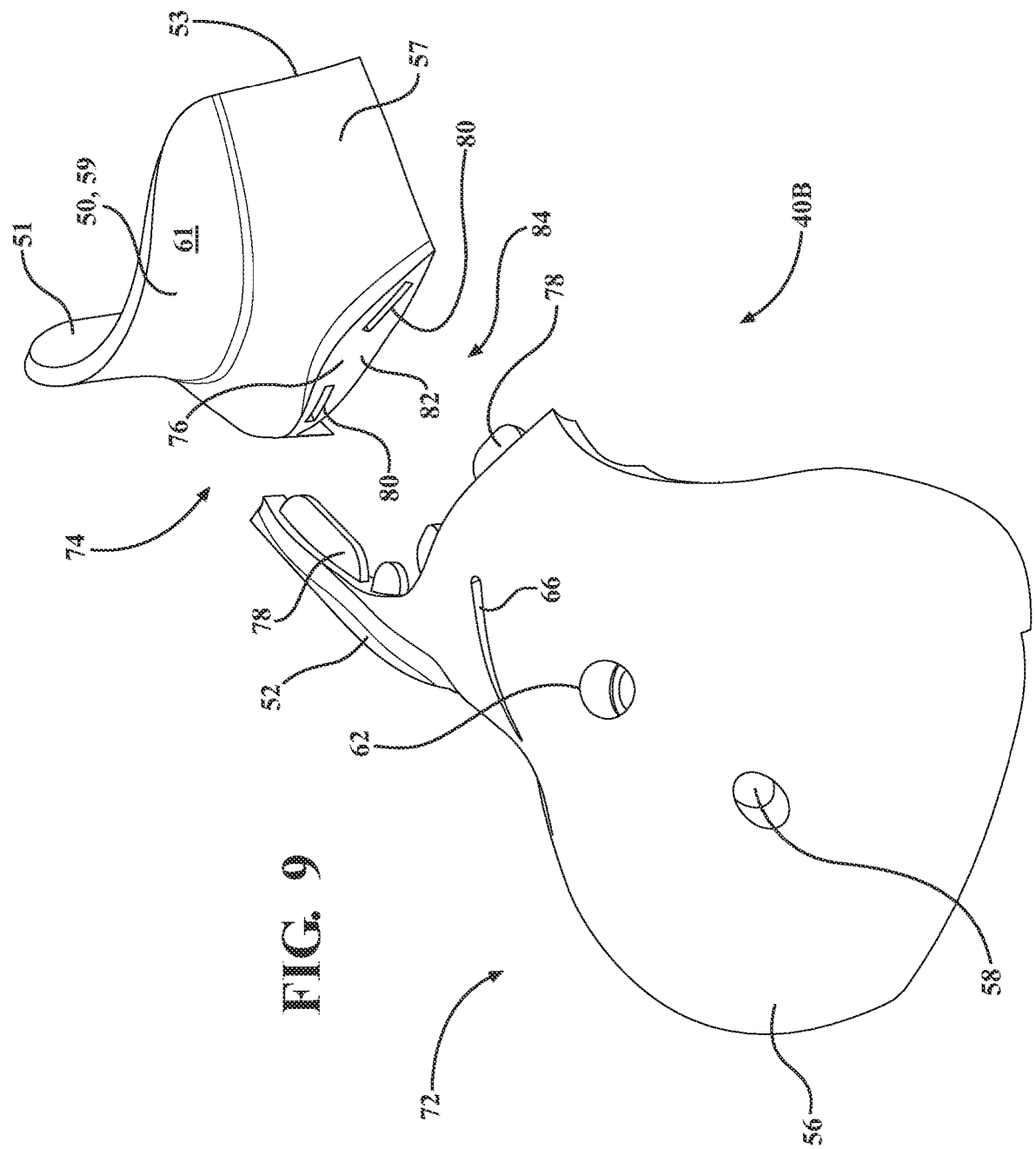
FIG. 9 is an exploded perspective view of the pad assembly of FIG. 6.
Figure 10:
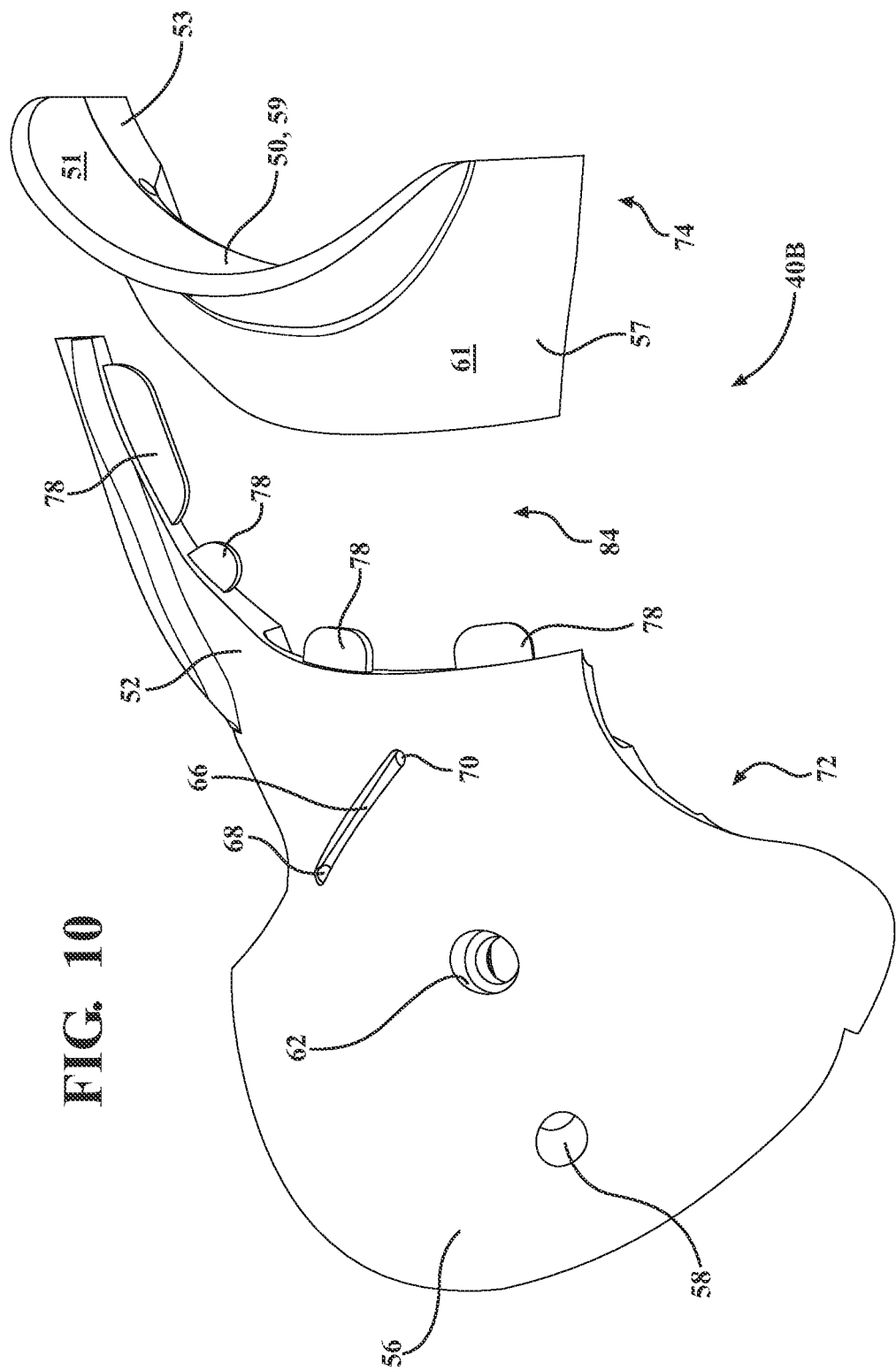
FIG. 10 is another exploded perspective view of the pad assembly of FIG. 6.
Figure 11:
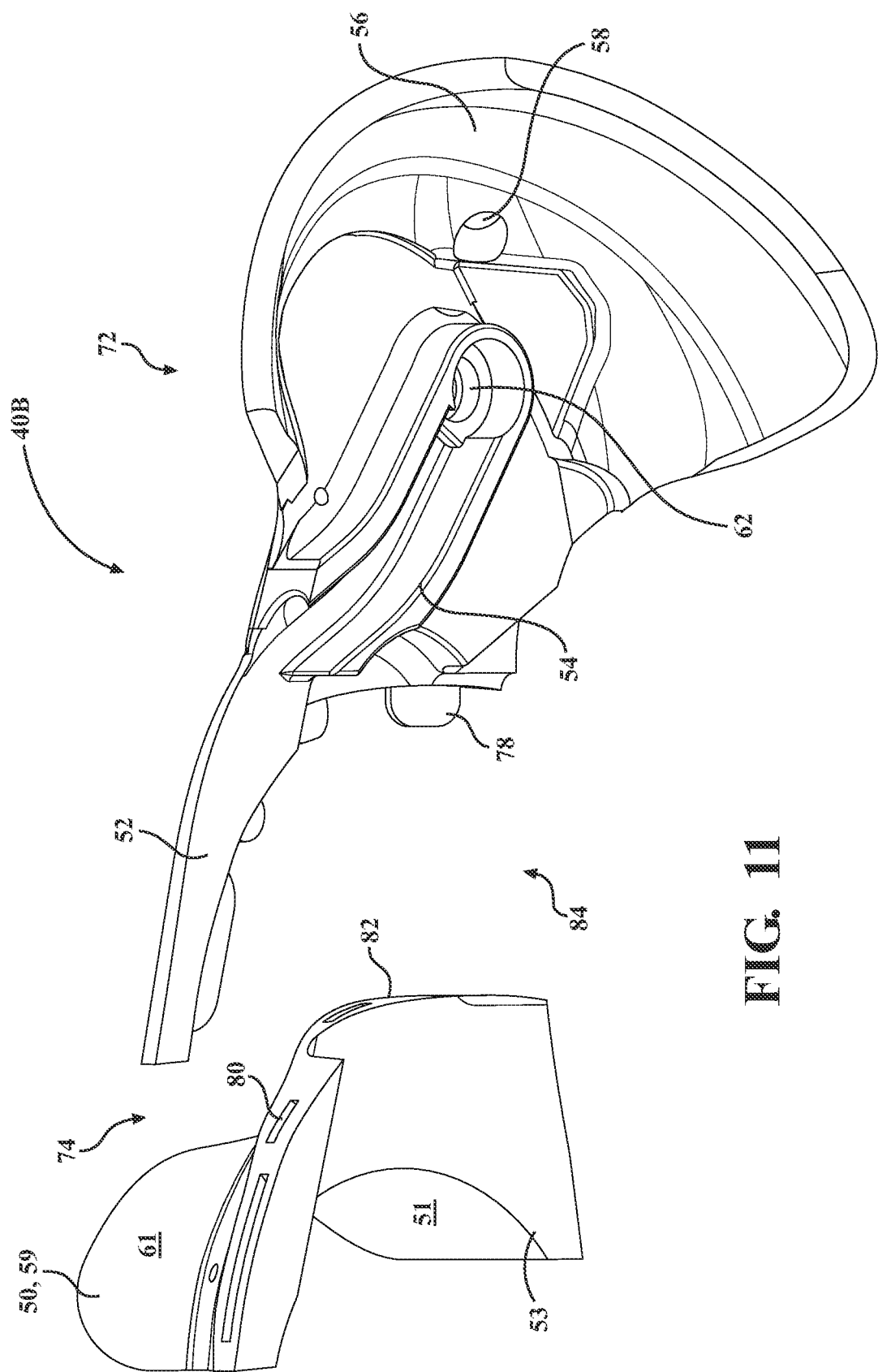

The anthropomorphic test device 12, includes a head assembly (shown as 14 in FIGS. 3-5). The anthropomorphic test device 12 also includes a neck assembly 16 mounted to and extending from the head assembly 14. The anthropomorphic test device 12 also includes a spine assembly, generally indicated at 18, having an upper end mounted to the neck assembly 16 and a lower end extending into a torso area of the anthropomorphic test device 12. The neck assembly 16 may be considered a portion of the spine assembly 18, in that the neck assembly 16 generally corresponds to the cervical spine portion of the spine assembly 18 in a human. A rib assembly 20 is also shown coupled to the spine assembly 18. A breast plate 35 is coupled to the rib assembly 20.

The anthropomorphic test device 12 also has pair of clavicle assemblies, In particular, the pair of opposing clavicle assemblies including a left clavicle assembly, generally indicated at 24, and a right clavicle assembly, generally indicated at 26 are coupled to breast plate 35 and extend from opposite sides of the spine assembly 18 at a position above the rib assembly 20 and beneath the head assembly 14. As such, the respective clavicle assemblies 24, 26 are coupled to the rib assembly 20 through the breast plate 35. In addition, the respective clavicle assemblies 24, 26 are therefore coupled to the spine assembly 18 through the breast plate 35 and rib assembly 20. The clavicle assemblies 24, 26 include a load cell (not shown) that is used to measure the force on the respective clavicle assembly 24, 26 during a crash test.

The anthropomorphic test device 12 also has pair of shoulder assemblies 37 are coupled to a respective one of the clavicle assemblies 24, 26 and a pair of arm assemblies including a left arm, generally indicated at 32, and a right arm, generally indicated 34, which are pivotally coupled to a respective one of the shoulder assemblies 37 through a pivoting mechanism 39. The shoulder assembly 37 can thus simulate the movement of a human shoulder and move forward and rearward, or up and down, in crash simulations.

As also shown in FIGS. 1A-1I, the anthropomorphic test device 12 also includes at least one pad assembly 40, 42. The test device 12 may include a pair of opposing pad assemblies, here a left pad assembly 40 and a right pad assembly 42, extending outwardly from opposite sides of the neck assembly 16 and respectively positioned adjacent to a corresponding one of the clavicle assemblies 24, 26 and a respective one of the arm assemblies 32, 34. The pad assembly 40 or 42 may be positioned on only one side of the test device 12, may be interconnected to extend to both sides of the test device 12, or may be two separate pad assemblies 40, 42 as illustrated. In the prior art embodiment illustrated in FIGS. 2-5, the left pad assembly and the right pad assembly are assigned the reference numerals 40A and 42A, whereas the left pad assembly and the right pad assembly in accordance with the exemplary embodiment provided herein in FIGS. 6-13 are assigned the reference numerals 40B and 42B.

Each of the pad assemblies 40, 42, in both the prior art embodiments (see FIGS. 2-5) and in the exemplary embodiment (see FIGS. 1 and 6-13), includes a neck region 50 that extends upwardly from a clavicle base region 52, with the clavicle base region 52 having a lower curved slot 54 which accepts a portion of the respective clavicle assembly 24, 26. The neck region 50 includes an inner curved surface 51 that extends around a portion of the neck assembly 16 and spine assembly 18.

Turning back to the subject invention, the neck region 50 includes a neck base portion 57 extending from the clavicle base region 52 and a raised neck portion 59 extending upward from the neck base portion 57 and away from the respective clavicle assembly 24, 26 in a direction towards the head assembly 14, with the raised neck portion 59 further defining the curved inner surface 51 which surrounds a portion of the spine assembly 18, and wherein the neck base portion 57 also defines a lower portion 53 of the inner surface 51. The neck base portion 57 may include one or more openings 55 (shown as a single opening 55 in FIG. 1D, for example) that extend between the lower portion 53 of the inner surface 51 and an outer surface 61 of the neck region 50. A tie wrap 63 may be introduced within the opening 55 and secured to (i.e., wrapped around) an inner portion of one of the clavicle assemblies 24, 26 to position the neck region 50 in a desired position adjacent to the spine assembly 18. For illustrative purposes, the tie wrap 63 is shown uncoupled from the opening 55 and one of the clavicle assemblies 24, 26 in FIG. 1D, but may be coupled through the opening 55 and secured to the respective clavicle assembly 24, 26 as described above when the respective pad assembly 40, 42 is coupled to the respective clavicle assembly 24, 26 during assembly and, in certain embodiments, remains coupled during subsequent crash test simulations.

Each of the pad assemblies 40, 42 also includes an arm region 56, sometimes referred to as a lateral region 56, extending outwardly from the clavicle base region 52 that is positioned adjacent to the top of a respective arm 32 or 34. The arm region 56 includes a first opening 58, here an access opening 58, through which a tool (not shown) can be introduced in order to adjust the respective underlying clavicle assembly 24, 26 or respective underlying shoulder assembly 37 after coupling of the pad assembly 40, 42. The arm region 56 may also include a second opening 62 through which a second fastening device 64 may be used to separately secure the pad assembly 40, 42 to the respective clavicle assembly 24, 26.

A groove 66 having a pair of a small openings 68, 70 may also be included on the pad assemblies 40, 42 in a location generally between the neck region 50 and the arm region 56. A tie wrap 69 is configured to be positioned within the groove 66, with its ends extending through the pair of small openings 68, 70 and towards the sternum of the anthropomorphic test device 12, with the ends secured to (i.e., wrapped around) the respective clavicle assembly 24, 26 to further position and secure the pad assemblies 40, 42 at the proper angle with respect to the respective clavicle assembly 24, 26 and neck assembly 16. For illustrative purposes, the tie wrap 69 is shown uncoupled from the groove 66 and one of the clavicle assemblies 24, 26 in FIG. 1D, but is coupled as described above when the respective pad assembly 40, 42 is coupled to the respective clavicle assembly 24, 26 during assembly and, in certain embodiments, remains coupled during subsequent crash test simulations.

In the prior art pad assemblies 40A, 42A of FIGS. 2-5, each of the pad assemblies 40A, 42A is formed as a single, integral structure having a relatively low stiffness (i.e., the structure of the formed pad assembly 40A or 42A has a relatively low stiffness). The low stiffness of the pad assemblies 40A, 42A as in FIGS. 2-5 generally provides a combination of support and durability for the pad assemblies 40A, 42A while also representing a biomechanical response of a human shoulder during crash testing in the absence of the use of a shoulder belt.

The term "stiffness", as defined herein and as used in the phrase "low stiffness" for describing the pad assemblies 40A, 42A, refers to the compressive modulus of a formed structure (here the formed pad assemblies 40A, 42A) as measured in accordance with ASTM D575, such as ASTM D575-91 (2018).

Exemplary materials for use in forming the low stiffness structure of the pad assemblies 40A, 42A include thermosetting plastic materials, such as a TDI-terminated polyester polyol, that form the thermoset plastic pad assemblies 40A, 42A having a maximum compressive modulus of 200 psi (i.e., 1.37895 MPa) at 10% strain (10% elongation) measured in accordance with ASTM D575. In certain embodiments, in addition to the maximum compressive modulus, the single integral structure of the thermoset plastic pad assemblies 40A, 42A also has a maximum Shore A hardness of 80, such as having a Shore A hardness from 40 to 80, such as from 65 to 77, such as from 70 to 75, as measured in accordance with ASTM D2240.

Referring now to FIGS. 3-5 of the prior art and owing to the use of the low stiffness pad assemblies 40A, 42A in accordance with the prior art as described immediately above, an entrapment issue of the seatbelt 102 between the respective pad assembly 40A, 42A and the spine assembly 18/neck assembly 16 may occur during collision testing. As best shown in FIGS. 3 and 4, the shoulder belt portion 100 of a seatbelt 102 is shown properly positioned relative to the left pad assembly 40A prior to a crash test simulation. In particular, the shoulder belt portion 100 is positioned adjacent to an upper surface of the left pad assembly 40A at a position outwardly away from the neck assembly 16 and inwardly from the left arm 32. More specifically, as best illustrated in FIG. 3, the shoulder belt portion 100 is positioned on the top surface of the arm region 56 opposite the clavicle assembly 26 at a position outwardly from the raised neck portion 59 of the neck region 50.

During the crash test simulation (i.e., during the collision testing), as best illustrated in FIG. 5, the head assembly 14 and neck assembly 16 are thrust forward against the shoulder belt portion 100 of the seatbelt 102, which is designed to restrain further movement. However, as illustrated in FIG. 5, the shoulder belt portion 100 may be moved inwardly towards the neck region 50 and is trapped between the neck assembly 16 and the inner curved surface 51 of the raised neck portion 59.

The embodiments of the present disclosure illustrated in FIGS. 1A-1I and 6-13 address some of the deficiencies of the prior art addressed with respect to Tylko as detailed in the background above and in general to integrally formed pad assemblies 40A, 42A as described above in FIGS. 2-5 in terms of reducing or eliminating entrapment of the shoulder belt portion 100 of the seat belt 102 as illustrated in FIG. 5 while maintaining the same overall part geometry of the pad assembly 40, 42, including that of the prior art pad assembly 40A, 42A.

In particular, as opposed to the low stiffness pad assemblies 40A, 42A as illustrated in FIGS. 2-5, the pad assemblies 40B, 42B of the embodiment provided herein as illustrated in FIGS. 6-13 include two separate portions, each having differing relative stiffnesses, that are coupled together to form pad assemblies 40B, 42B having the same overall pad assembly geometry as the prior art pad assemblies 40A, 42A as shown in FIGS. 2-5 but addressing the deficiencies in the prior art pad assemblies 40A, 42A with respect to entrapment.

Referring to FIGS. 6-13, each pad assembly 40B, 42B (the left pad assembly 40B is shown in FIGS. 6-13) includes a clavicle portion 72, which includes the arm region 56 and the clavicle base region 52 as described above. In addition, each pad assembly 40B, 42B also includes a neck portion 74, which includes the neck region 50 further broken up into the neck base portion 57 and raised neck portion 59, as described above. The two portions 72, 74 are coupled together utilizing complimentary internal mechanical locking features, and optionally additionally through the use of an adhesive applied between the coupled parts, to maximize the integrity of the coupled shoulder assembly 40B, 42B as will be described in further detail that follows without altering the overall pad assembly geometry. In this embodiment, the neck portion 74 has a higher relative stiffness than the corresponding lower stiffness of the clavicle portion 72.

As noted above, the term "stiffness", as defined herein and as related to the terms "higher stiffness" or "lower stiffness" or "stiffer", refers to the compressive modulus of the respective two portions 72, 74, as measured in accordance with ASTM D575, such as ASTM D575-91 (2018). Accordingly, for the purpose of the present disclosure, a part or structure having a higher compressive modulus value (measured in MPa or pounds per square inch ("psi")) at a particular percentage of strain (i.e., percent elongation) measured in accordance with ASTM D575, here the neck portion 74, is considered to be "stiffer" than a corresponding part or structure having a lower relative compressive modulus value (i.e., a lower stiffness material or part), here the clavicle portion 72, measured at the same percentage of strain under the same measurement conditions in accordance with ASTM D575.

In the embodiments provided herein, the neck portion 74 has a minimum compressive modulus value of 1500 psi (i.e., 10.34214 MPa) at 10% strain (10% elongation) measured in accordance with ASTM D575, while the clavicle portion 72 has a maximum compressive modulus of 200 psi (i.e., 1.37895 MPa) at 10% strain (10% elongation) measured in accordance with ASTM D575.

In certain embodiments, the neck portion 74 also has a higher Shore hardness value as compared with the clavicle portion 72, with the Shore hardness values measured in accordance with ASTM D2240. In particular embodiments, the neck portion 74 has a minimum Shore D hardness of 50, such as ranging from a Shore D hardness of 50 to 80, such as from 60 to 70, such as from 64 to 66, as measured in accordance with ASTM D2240. In addition, the clavicle portion 72 has a maximum Shore A hardness of 80, such as from 40 to 80, such as from 65 to 77, such as from 70 to 75, as measured in accordance with ASTM D2240.

Exemplary thermosetting materials for use in forming the higher stiffness neck portion 74 include thermosetting plastic materials such a TDI-terminated polyether polyol (i.e., a toluene diisocyanate-terminated polyether polyol). Exemplary thermosetting materials for use in forming the lower stiffness clavicle portion 72 include thermosetting plastic materials such as those described above in forming the shoulder assemblies 40A, 42A according to the prior art, such as TDI-terminated polyester polyols.

The introduction of the higher relative degree of stiffness to the neck portion 74 of the respective pad assembly 40B, 42B, provides sufficient stiffness to the pad assembly 40B, 42B to prevent the shoulder belt portion 100 from slipping (due primarily to the deformation of the raised neck portion 59 from force applied by the shoulder belt portion 100 during a collision test as described above) and prevents or minimizes the possibility of the shoulder belt portion 100 from getting entrapped between the pad assembly 40B, 42B and the neck assembly/spine assembly 16, 18 as illustrated best in FIG. 5. Further, by maintaining the clavicle portion 72 of the pad assembly 40B, 42B as having the same low stiffness as the corresponding portions of the pad assembly 40A, 42A, and by generally maintaining the overall part geometry of the pad assembly 40A, 42A, the current dummy biomechanical responses of the new pad assemblies 40B, 42B perform consistently with and generally correspond to the performance with the integrally formed, single material, pad assemblies 40A, 42A of FIGS. 2-5 in terms of biomechanical response during a crash simulation.

Owing to the use of separate clavicle portion 72 and neck portion 74, and in order to maintain the overall design in accordance with the prior art pad assemblies 40A, 42A, such parts 72, 74 must be coupled, preferably mounted, together in a manner that does not affect the overall part geometry of the resultant pad assemblies 40, 40B, 42, 42B. To accomplish this coupling, at least one, and preferably multiple mechanical locking features, in the form of at least one flange 78 and corresponding slot 80, are included to couple the respective clavicle portion 72 and neck portion 74 together. Further, in certain embodiments, an adhesive 76 is applied to one or both of the clavicle portion 72 and the neck portion 74 to secure the clavicle portion 72 to the neck portion 74. The adhesive could also be applied to the flange 78 and/or to the slot 80.

In certain embodiments, such as shown in the embodiments of FIGS. 6-13, a plurality of flanges 78 are included on the clavicle portion 72, whereas corresponding slots 80 are included on the neck portion 74. However, in alternative equivalent embodiments (not shown), the flanges 78 are included on the neck portion 74, whereas the corresponding slots 80 are included on the clavicle portion 72.

To form one of the pad assemblies 40B or 42B in accordance with the embodiment illustrated in FIGS. 6-13 (in which the clavicle portion 72 includes the one or more slots 80 and in which the neck portion 74 includes the corresponding one or more flanges 78 defining the mechanical interlock), the clavicle portion 72 is first molded from a first thermosetting plastic material and includes the afore-mentioned one or more slots 80. The molding of the clavicle portion 72 can be done via conventional molding techniques. The formed clavicle portion 72 is then then placed into a second mold, in which the one or more slots 80 are open to the second thermosetting material used to form the neck portion 74. Accordingly, during the second molding process, the second thermosetting material is introduced to the second mold and flows through the slots 80 to form the neck portion 74. A portion of the second thermosetting material remains within the slots 80 of the clavicle portion 72, and thus forms the respective one or more flanges 78 of the neck portion 74 that are contained within the corresponding slots 80 to form the mechanical interlocking of the clavicle portion 72 and the neck portion 74 to complete the formation of the respective pad assembly 40B or 42B. In certain embodiments, an adhesive 76 is applied to the interface surface 82 of the clavicle portion 72 before molding the neck portion 74 to create additional bonding of the joint 84 between the two parts 72, 74.

In an alternative method for forming the respective pad assembly 40B or 42B, in which the neck portion 74 is formed with the one or more slots 80 and in which the clavicle portion 72 is formed with the corresponding one or more flanges 78, the method can be formed in substantially the same manner to the pad assemblies 40B or 42B illustrated in FIGS. 6-13. In particular, the neck portion 74 is first molded from a first thermosetting plastic material and includes the afore-mentioned one or more slots 80 using the same technique as above. The formed neck portion 74 is then then placed into a second mold, in which the one or more slots 80 are open to the second thermosetting material used to form the clavicle portion 72. Accordingly, during the second molding process, the second thermosetting material is introduced to the second mold and flows through the slots 80 to form the clavicle portion 72. A portion of the second thermosetting material remains within the slots 80, and thus forms the respective one or more flanges 78 of the clavicle portion 72 that are contained within the corresponding slots 80 of the neck portion 74 to form the mechanical interlocking of the clavicle portion 72 and the neck portion 74 to complete the formation of the respective pad assembly 40B or 42B. In certain embodiments, an adhesive 76 is applied to the interface surface of the neck portion 74 before molding the clavicle portion 72 to create additional bonding of the joint 84 between the two parts 72, 74. The adhesive 76 utilized can be any adhesive, typically a polymeric adhesive containing polymers and resins, such as a non-chlorinated adhesive including a phenolic resin and a phenol, used to adhere thermoset materials so long at it provides sufficient adhesive strength between the parts 72, 74 to prevent separation of the parts 72, 74 during crash simulations.

While FIGS. 9-12 illustrate the clavicle portion 72 and neck portion 74 in an exploded view for illustrative purposes, such parts 72, 74 formed in accordance with the method described above are not formed as separate structures that are subsequently mechanically locked together, and optionally adhered together using the adhesive 76. However, in alternative embodiments, the clavicle portion 72 and neck portion 74 could be formed as separate structures and subsequently mechanically locked together, and optionally adhered together using the adhesive 76, to form the respective pad assembly 40B, 42B.

While the left pad assembly 40B is illustrated in FIGS. 6-13, the right pad assembly 42B is constructed in the similar way to the left pad assembly 40B. Finite element analysis on the pad assemblies 40B, 42B formed according to the present disclosure, and this analysis demonstrated that the newly formed pad assemblies 40B, 42B are robust and can therefore address the shoulder belt entrapment issue found in the prior art pad assemblies 40A, 42A without influencing the biomechanical response to a collision test under the same test conditions as compared with the prior art pad assemblies 40A, 42A.

The present disclosure also describes a system 1000 for creating a virtual anthropomorphic test device and evaluating the created virtual anthropomorphic test device in a virtual crash test using a software application included on a computer. The anthropomorphic test device is a virtual representation of the anthropomorphic test device described above, including all of the features and components of the pad assemblies 40B, 42B, and the associated additional components of the anthropomorphic test device 12, as described above. The system 1000 also provides for evaluating such pad assemblies 40B, 42B that include portions 72, 74 having different stiffnesses, as described above.

Referring now to FIG. 14, the computer 1030 may include at least one processor 1032, a memory 1034, a mass storage memory device 1036, an input/output (I/O) interface 1038, and a Human Machine Interface (HMI) 1040. The computer 1030 may also be operatively coupled to one or more external resources 1042 via the network 1013 and/or I/O interface 1038. External resources may include, but are not limited to, servers, databases, mass storage devices, peripheral devices, cloud-based network services, or any other suitable computing resource that may be used by the computer 1030.

The processor 1032 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 1034. Memory 1034 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 1036 may include data storage devices such as a hard drive, optical drive, tape drive, non-volatile solid state device, or any other device capable of storing information. A database 1044 may reside on the mass storage memory device 1036 and may be used to collect and organize data used by the various systems and modules described herein.

Processor 1032 may operate under the control of an operating system 1046 that resides in memory 1034. The operating system 1046 may manage computing resources so that computer program code embodied as one or more computer software applications, such as an application 1048 residing in memory 1034, may have instructions executed by the processor 1032. In an alternative embodiment, the processor 1032 may execute the application 1048 directly, in which case the operating system 1046 may be omitted. One or more data structures 1050 may also reside in memory 1034, and may be used by the processor 1032, operating system 1046, and/or application 1048 to store or manipulate data. The software application 1048, as provided herein, includes software applications that create the virtual anthropomorphic test device 10' and software applications that evaluate the created virtual anthropomorphic test device 10' in a virtual crash test setting.

The I/O interface 1038 may provide a machine interface that operatively couples the processor 1032 to other devices and systems, such as the network 1013 and/or external resource 1042. The application 1048 may thereby work cooperatively with the network 1013 and/or external resource 1042 by communicating via the I/O interface 1038 to provide the various features, functions, applications, processes, and/or modules comprising embodiments of the invention. The application 1048 may also have program code that is executed by one or more external resources 1042, or otherwise rely on functions and/or signals provided by other system or network components external to the computer 1030. Indeed, given the nearly endless hardware and software configurations possible, persons having ordinary skill in the art will understand that embodiments of the invention may include applications that are located externally to the computer 1030, distributed among multiple computers or other external resources 1042, or provided by computing resources (hardware and software) that are provided as a service over the network 1013, such as a cloud computing service.

The HMI 1040 may be operatively coupled to the processor 1032 of computer 1030 in a known manner to allow a user of the computer 1030 to interact directly with the computer 1030. The HMI 1040 may include video and/or alphanumeric displays, a touch screen, a speaker, and any other suitable audio and visual indicators capable of providing information to the user. The HMI 1040 may also include input devices and controls such as an alphanumeric keyboard, a pointing device, keypads, pushbuttons, control knobs, microphones, etc., capable of accepting commands or input from the user and transmitting the entered input to the processor 1032.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A pad assembly for an anthropomorphic test device, the anthropomorphic test device comprising:
   a spine assembly;
   a pair of clavicle assemblies coupled to and extending respectively from opposite sides of
   the spine assembly; and
   a pair of arms with a respective one of the arms coupled to a corresponding respective one of the pair of clavicle assemblies; and
   the pad assembly comprising:
   a clavicle portion positioned adjacent one of the pair of arms; and
   a neck portion mounted to said clavicle portion and positioned adjacent to the spine assembly,
   wherein said neck portion is stiffer than said clavicle portion.

2. The pad assembly of claim 1, wherein the stiffness of said neck portion and said clavicle portion are measured in accordance with ASTM D575.

3. The pad assembly of claim 1, wherein said neck portion has a minimum compressive modulus of 10.34214 MPa at 10% strain measured in accordance with ASTM D575.

4. The pad assembly of claim 1, wherein said clavicle portion has a maximum compressive modulus of 1.3785 MPa at 10% strain measured in accordance with ASTM D575.

5. The pad assembly of claim 3, wherein said clavicle portion has a maximum compressive modulus of 1.3785 MPa at 10% strain measured in accordance with ASTM D575.

6. The pad assembly of claim 1, wherein said neck portion has a neck base region and a raised neck region with said raised neck region extending from said neck base region to a position adjacent the spine assembly.

7. The pad assembly of claim 1, wherein said clavicle portion has a clavicle base region having a slot for receiving one of said clavicle assemblies, and an arm region extending from said clavicle base region adjacent the arm.

8. The pad assembly of claim 7, wherein said neck portion has a neck base region mounted to said clavicle base region and a raised neck region extending from said neck base region in a direction opposite and away from said clavicle assemblies.

9. The pad assembly of claim 1, wherein a respective one of said clavicle portion and said neck portion includes at least one flange and a respective other one of said clavicle portion and said neck portion includes at least one slot for receiving said flange.

10. The pad assembly of claim 1, further comprising an adhesive applied between said clavicle portion and said neck portion for securing said clavicle portion to said neck portion.

11. The pad assembly of claim 1, wherein said clavicle portion has a maximum Shore A hardness of 80 as measured in accordance with ASTM D2240; and
   wherein said neck portion has a minimum Shore D hardness of 50 as measured in accordance with ASTM D2240.

* * * * *